US012694364B2

(12) United States Patent
Setterstrom

(10) Patent No.: US 12,694,364 B2
(45) Date of Patent: Jul. 28, 2026

(54) CARGO HANDLING REAL TIME LOCALIZATION SYSTEM

(71) Applicant: GOODRICH CORPORATION, Charlotte, NC (US)

(72) Inventor: Kevin Setterstrom, Jamestown, ND (US)

(73) Assignee: GOODRICH CORPORATION, Charlotte, NC (US)

( * ) Notice: Subject to any disclaimer, the term of this patent is extended or adjusted under 35 U.S.C. 154(b) by 419 days.

(21) Appl. No.: 18/481,178

(22) Filed: Oct. 4, 2023

(65) Prior Publication Data

US 2025/0117739 A1    Apr. 10, 2025

(51) Int. Cl.
*G06Q 10/0833* (2023.01)
*B65G 1/137* (2006.01)

(52) U.S. Cl.
CPC ....... *G06Q 10/0833* (2013.01); *B65G 1/1371* (2013.01); *B65G 2203/0283* (2013.01)

(58) Field of Classification Search
CPC .............. G06Q 10/0833; B65G 1/1371; B65G 2203/0283; G01S 5/0027; G01S 5/145; B64D 2009/006; B64D 9/00
See application file for complete search history.

(56) References Cited

U.S. PATENT DOCUMENTS 7,069,111 B2    6/2006  Glenn et al.
8,838,374 B2    9/2014  Tan et al.

10,094,910 B2    10/2018  Hamilton
10,616,710 B2 *    4/2020  Stitt ...................... H04W 4/021
10,846,656 B2    11/2020  Gollii
2011/0025562 A1    2/2011  Hol et al.
(Continued)

FOREIGN PATENT DOCUMENTS

CN    102648473 A  *  8/2012  ......... G06K 7/10346
CN    102687039 A  *  9/2012  ............. G08B 13/02
(Continued)

OTHER PUBLICATIONS

Pozyx, "Multi Technology RTLS-Indoor & Outdoor", URL: https://www.pozyx.io/, 14 pages, retrieved Sep. 12, 2023.
(Continued)

*Primary Examiner* — Jacob S. Scott
*Assistant Examiner* — Erin Morris
(74) *Attorney, Agent, or Firm* — SNELL & WILMER L.L.P.

(57)    ABSTRACT

A cargo controller is disclosed herein. The cargo controller includes a wireless emergency module including an ultra-wide band radio, the wireless emergency module configured to communicate with a plurality of cargo emergency stations of a cargo handling system using the ultra-wide band radio, a wireless control module configured to communicate with a cargo control station of the cargo handling system, a processor, a memory operatively coupled to the processor. The memory includes instructions stored thereon that, when executed by the processor, cause the processor to receive ultra-wide band radio signals from the plurality of cargo emergency stations, determine a location within the cargo handling system based on the received ultra-wide band radio signals, and transmit the location to the cargo handling system.

20 Claims, 17 Drawing Sheets

(56) References Cited

U.S. PATENT DOCUMENTS

| | | | | |
|---|---|---|---|---|
| 2011/0133891 A1* | 6/2011 | Krug | ................. | G06K 7/10316 |
| | | | | 340/10.1 |
| 2012/0232942 A1* | 9/2012 | Gaug | ................... | G06Q 10/06 |
| | | | | 705/7.12 |
| 2016/0014583 A1* | 1/2016 | Thomaschima | ........ | H04W 4/90 |
| | | | | 455/404.2 |
| 2019/0265327 A1* | 8/2019 | Bennison | ............. | G01S 7/4817 |
| 2021/0304577 A1* | 9/2021 | Hollar | ................. | G06V 40/103 |
| 2022/0248173 A1* | 8/2022 | Oishi | ................... | H04W 4/027 |
| 2022/0270458 A1* | 8/2022 | Mann | ................. | G08B 13/2462 |
| 2023/0125388 A1 | 4/2023 | Setterstrom et al. | | |
| 2023/0168337 A1 | 6/2023 | Ring et al. | | |
| 2024/0402727 A1* | 12/2024 | Huang | ..................... | B64F 5/60 |

FOREIGN PATENT DOCUMENTS

| | | | | | | |
|---|---|---|---|---|---|---|
| CN | 114037365 | | | 2/2022 | | |
| CN | 114037365 | A | * | 2/2022 | .............. | H04W 4/35 |
| DE | 102017130007 | A1 | * | 6/2018 | .............. | G01V 8/12 |
| EP | 4086831 | | | 11/2022 | | |
| EP | 4086831 | A1 | * | 11/2022 | .......... | G01S 13/878 |
| IT | 201800003692 | | | 9/2019 | | |
| IT | 201800003692 | A1 | * | 9/2019 | .............. | G01S 5/14 |
| RU | 2734099 | C1 | * | 10/2020 | .......... | G01S 5/0294 |
| WO | WO-2023285229 | A1 | * | 1/2023 | ................ | B60P 1/52 |

OTHER PUBLICATIONS

European Patent Office, European Search Report dated Feb. 6, 2025 in Application No. 24201039.5.

* cited by examiner

608

610

CARGO HANDLING REAL TIME LOCALIZATION SYSTEM

FIELD

The present disclosure generally relates to the field of cargo handling systems and, more particularly, real time localization of a wireless device within a cargo handling system.

BACKGROUND

Legacy cargo systems include fixed control panels in which the positions of these panels are known by the control system. The existing control loops today do not allow the operators to drive cargo into themselves, as the software drive logic will not allow cargo operation when the unit load devices (ULDs) are within a certain distance of the control panel. As soon as these control panels move to wireless applications, there is no system in place to guarantee where the controller is in space.

As technology is expanding in the cargo aircraft industry, wireless devices are becoming more common. Numerous benefits have been identified with the addition of wireless cargo interfaces, one of them being the reduction in number of operators needed when loading and unloading. Operator reduction is achievable due to the ability for a single operator to position themselves freely during the operations.

SUMMARY

Disclosed herein is a cargo controller including a wireless emergency module including an ultra-wide band radio, the wireless emergency module configured to communicate with a plurality of cargo emergency stations of a cargo handling system using the ultra-wide band radio, a wireless control module configured to communicate with a cargo control station of the cargo handling system, a processor, a memory operatively coupled to the processor. The memory comprising instructions stored thereon that, when executed by the processor, cause the processor to receive ultra-wide band radio signals from the plurality of cargo emergency stations, determine a location within the cargo handling system based on the received ultra-wide band radio signals, and transmit the location to the cargo handling system.

In various embodiments, the cargo controller further includes an input device configured to indicate a direction to move a unit load device within the cargo handling system and the instructions, when executed by the processor, further cause the processor to receive and indication of a control zone to be operated by the cargo controller and transmit received input from the input device to the cargo handling system in response to the cargo controller being located in the control zone. In various embodiments, the instructions, when executed by the processor, further cause the processor to receive and indication of the control zone to be operated by the cargo controller and ignore input from the input device in response to the cargo controller being outside of the control zone.

In various embodiments, the cargo controller further includes a plurality of control mode indicators, a plurality of cargo operation indicators, and a plurality of orientation indicator lights. In various embodiments, each of the plurality of control mode indicators indicates a mode control for a control zone in the cargo handling system based at least in part on the location of the cargo controller. In various embodiments, each of the plurality of cargo operation indicators indicate a cargo handling operation that can be performed based at least in part on the location of the cargo controller. In various embodiments, the plurality of orientation indicator lights indicates an orientation of the cargo controller within the cargo handling system.

Also disclosed herein is a cargo handling system including a plurality of power drive units (PDUs), a plurality of real-time location system (RTLS) anchors disposed within the cargo handling system, a first RTLS device configured to communicate with the plurality of RTLS anchors and determine a real-time location of the first RTLS device based at least in part on the communication with the plurality of RTLS anchors, a processor, and a memory operatively coupled to the processor. The memory comprising instructions stored thereon that, when executed by the processor, cause the processor to receive a first location from the first RTLS device, receive a cargo transfer input from the first RTLS device, and activate the plurality of PDUs to move a unit load device (ULD) in a first zone of the cargo handling system in response to the cargo transfer input and based on the first location being within the first zone.

In various embodiments, the cargo handling system further includes a second RTLS device configured to communicate with the plurality of RTLS anchors and determine a second real-time location of the second RTLS device based at least in part on the communication with the plurality of RTLS anchors and the instructions, when executed by the processor, further cause the processor to receive a second location from the second RTLS device and deactivate the plurality of PDUs in response to the second location being in the first zone and in a path of travel of the ULD. In various embodiments, the instructions, when executed by the processor, further cause the processor to receive a third location from the second RTLS device and activate the plurality of PDUs in response to the third location being in a second zone.

In various embodiments, the instructions, when executed by the processor, further cause the processor to prevent the second RTLS device from controlling the plurality of PDUS in the first zone in response to the first RTLS device being in the first zone before the second RTLS device. In various embodiments, the instructions, when executed by the processor, further cause the processor to receive an input from the first RTLS device to rotate the ULD in a second zone, and send an alert to the first RTLS device in response to the first location being outside of the second zone.

In various embodiments, the first RTLS device communicates with the plurality of RTLS anchors using ultra-wide band radio signals. In various embodiments, the instructions, when executed by the processor, further cause the processor to receive a second location from the first RTLS device, and prevent the first RTLS device from controlling the plurality of PDUs in the first zone in response to the second location being outside of the first zone.

In various embodiments, the instructions, when executed by the processor, further cause the processor to determine a zone of danger for the first RTLS device based on the first location, and stopping a movement of the ULD in response to the ULD entering the zone of danger. In various embodiments, the instructions, when executed by the processor, further cause the processor to receiving a second location from the first RTLS device, deactivate control of the first zone for the first RTLS device based on the second location, and activate control of a second zone for the first RTLS device based on the second location.

Also disclosed herein is a cargo handling system including a plurality of power drive units (PDUs), a plurality of real-time location system (RTLS) anchors disposed within the cargo handling system, a first RTLS device configured to communicate with the plurality of RTLS anchors and determine a first real-time location of the first RTLS device based at least in part on the communication with the plurality of RTLS anchors, a second RTLS device configured to communicate with the plurality of RTLS anchors and determine a second real-time location of the first RTLS device based at least in part on the communication with the plurality of RTLS anchors, a processor, and a memory operatively coupled to the processor. The memory comprising instructions stored thereon that, when executed by the processor, cause the processor to define a plurality of control zones within the cargo handling system, each of the plurality of control zones including a subset of the plurality of PDUs, receive a first location from the first RTLS device, receive a second location from the second RTLS device, grant permission to the first RTLS device to control a first zone of the plurality of control zones based on the first location, and grant permission to the second RTLS device to control a second zone of the plurality of control zones based on the second location.

In various embodiments, the instructions, when executed by the processor, further cause the processor to activate a first subset of the plurality of PDUs to move a unit load device within the first zone in response to an input from the first RTLS device, and stop the movement of the ULD after the ULD enters the second zone. In various embodiments, the instructions, when executed by the processor, further cause the processor to receive a third location from the first RTLS device, deny permission to the first RTLS device to control the second zone in response to the third location being in the second zone and the second RTLS device having permission to control the second zone.

In various embodiments, the instructions, when executed by the processor, further cause the processor to receive a third location from the first RTLS device, remove permission from the first RTLS device control the first zone based on the third location, and grant permission to the first RTLS device to control a third zone of the plurality of control zones based on the third location.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

Figure 1A:
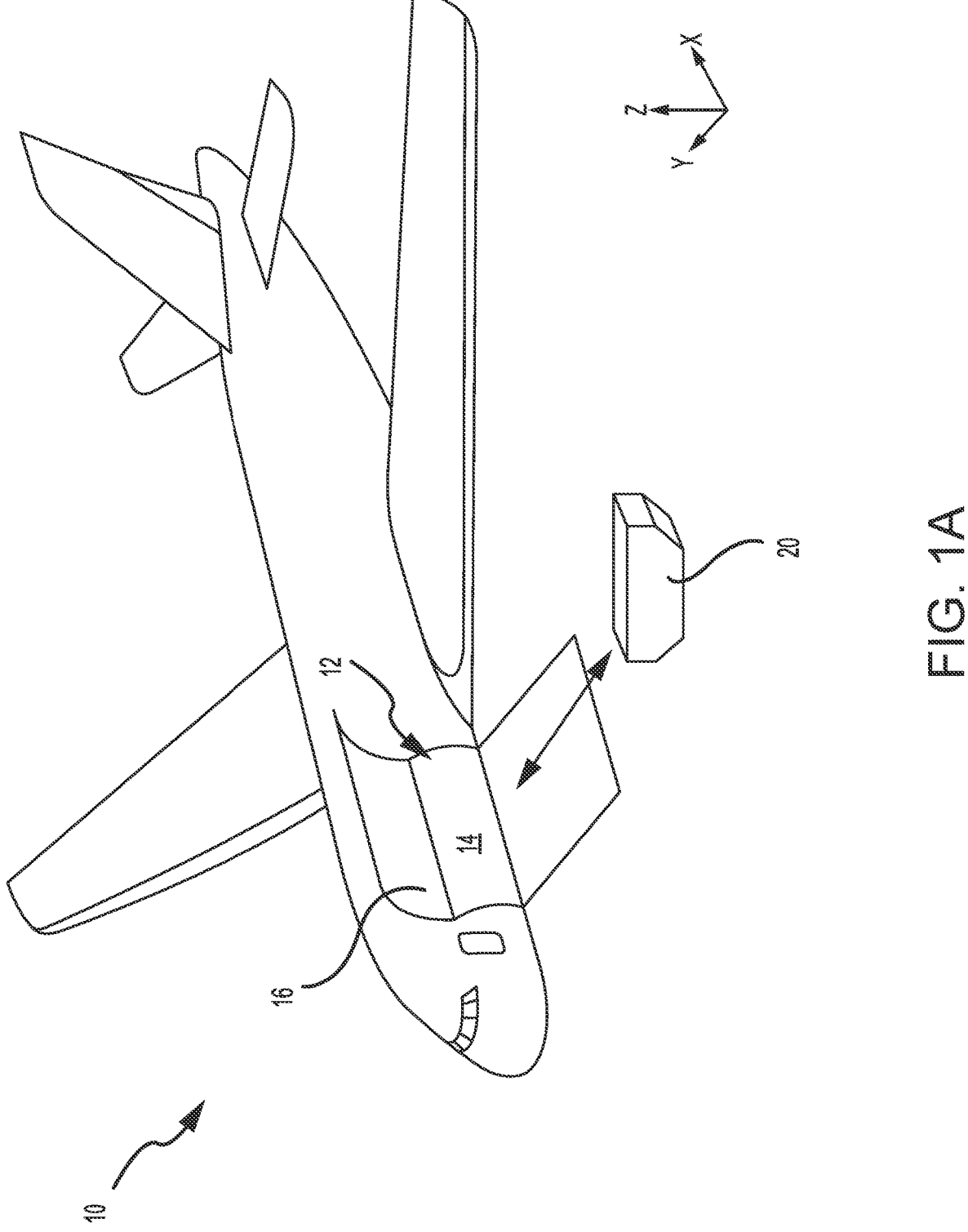
FIG. 1A illustrates a schematic view of an aircraft being loaded with cargo, in accordance with various embodiments.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. While these exemplary embodiments are described in sufficient detail to enable those skilled in the art to practice the invention, it should be understood that other embodiments may be realized and that logical, chemical and mechanical changes may be made without departing from the spirit and scope of the invention. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

When moving around a cargo compartment of an aircraft, a location of a mobile cargo controller within the cargo compartment is, in many instances, changing frequently. Such a change in the location of the mobile cargo controller may be dangerous for the operator with the movement of cargo.

Disclosed herein is a system for monitoring the real-time location of the mobile cargo controller with and around the aircraft. In various embodiments, the system consists of two types of devices a real-time location system (RTLS) wireless station, or anchor, and RTLS wireless cargo devices (e.g., controllers and/or tags). In various embodiments, the system uses ultra-wide band radio signals between the RTLS wireless stations and the RTLS wireless cargo devices to determine a precise real-time location for each RTLS wireless cargo device. As discussed herein, the system, in various embodiments, may improve operator safety by knowing, in a real-time, the precise location of each RTLS wireless device, which is held by the operator. In various embodiments, the system improves the security of the system by knowing where each RTLS wireless device is located and preventing operation of the cargo handling system by a RTLS device outside of the cargo system.

With reference to FIG. 1A, a schematic view of an aircraft 10 having a cargo deck 12 located within a cargo compartment 14 is illustrated, in accordance with various embodiments. Aircraft 10 may comprise a cargo load door 16 located, for example, at one side of a fuselage structure of aircraft 10. A unit load device (ULD) 20, in the form of a container or pallet, for example, may be loaded through cargo load door 16 and onto cargo deck 12 of aircraft 10 or, conversely, unloaded from cargo deck 12 of aircraft 10. In general, ULDs are available in various sizes and capacities, and are typically standardized in dimension and shape. Once loaded with items destined for shipment, ULD 20 is transferred to aircraft 10 and then loaded onto the aircraft 10 through cargo load door 16 using a conveyor ramp, scissor lift or the like. Once inside aircraft 10, ULD 20 is moved within cargo compartment 14 to a final stowed position. Multiple ULDs may be brought on-board aircraft 10, with each ULD 20 being placed in a respective stowed position on cargo deck 12. After aircraft 10 has reached its destination, each ULD 20 is unloaded from aircraft 10 in similar fashion, but in reverse sequence to the loading procedure. To facilitate movement of ULD 20 along cargo deck 12, aircraft 10 may include a cargo handling system as described herein in accordance with various embodiments.

Figure 1B:
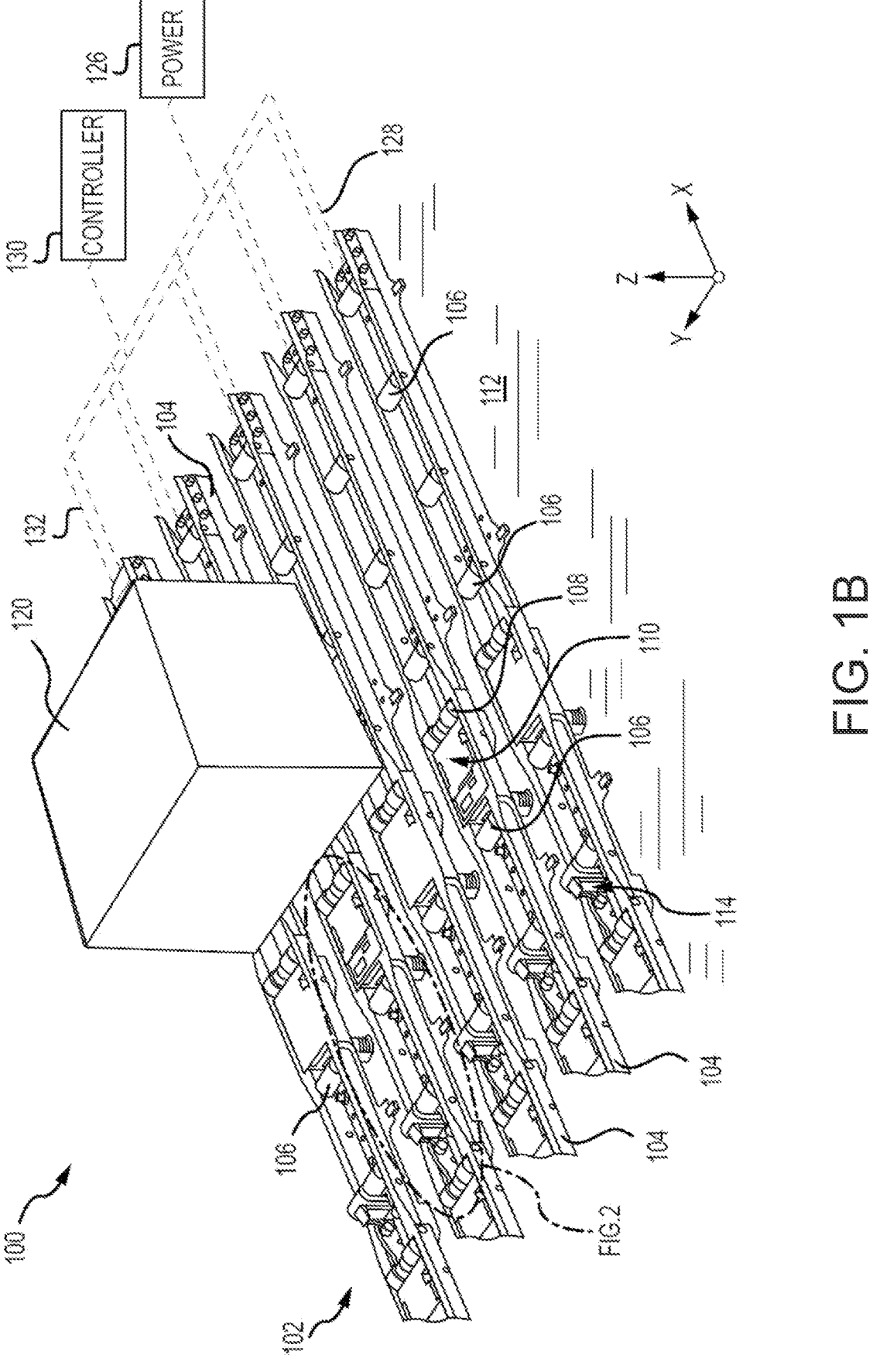
FIG. 1B illustrates a portion of a cargo handling system, in accordance with various embodiments.

Referring now to FIG. 1B, a portion of a cargo handling system 100 is illustrated, in accordance with various embodiments. Cargo handling system 100 is illustrated with reference to an XYZ coordinate system, with the X-direction extending longitudinally and the Z-direction extending vertically with respect to an aircraft in which cargo handling system 100 is positioned, such as, for example, aircraft 10 described above with reference to FIG. 1A. In various embodiments, cargo handling system 100 may define a conveyance surface 102 having a plurality of trays 104 supported by a cargo deck 112, such as, for example, the cargo deck 12 described above with reference to FIG. 1A. The plurality of trays 104 may be configured to support a unit load device (ULD) 120 (or a plurality of ULDs), such as, for example, unit load device (ULD) 20 described above with reference to FIG. 1A. In various embodiments, ULD 120 may comprise a container or a pallet configured to hold cargo as described above. In various embodiments, plurality of trays 104 is disposed throughout cargo deck 112 and may support a plurality of conveyance rollers 106, where one or more or all of the plurality of conveyance rollers 106 is a passive roller.

In various embodiments, the plurality of trays 104 may further support a plurality of power drive units (PDUs) 110, each of which may include one or more drive wheels or drive rollers 108 that may be actively powered by a motor. In various embodiments, one or more of the plurality of trays 104 is positioned longitudinally along cargo deck 112—e.g., along the X-direction extending from the forward end to the aft end of the aircraft. In various embodiments, the plurality of conveyance rollers 106 and the one or more drive rollers 108 may be configured to facilitate transport of ULD 120 in the forward and the aft directions along conveyance surface 102. During loading and unloading. ULD 120 may variously contact the one or more drive rollers 108 to provide a motive force for transporting ULD 120 along conveyance surface 102. Each of the plurality of PDUs 110 may include an actuator, such as, for example, an electrically operated motor, configured to drive the one or more drive rollers 108 corresponding with each such PDU 110. In various embodiments, the one or more drive rollers 108 may be raised from a lowered position beneath conveyance surface 102 to an elevated position protruding above conveyance surface 102 by the corresponding PDU. As used with respect to cargo handling system 100, the term "beneath" may refer to the negative Z-direction, and the term "above" may refer to the positive Z-direction with respect to conveyance surface 102. In the elevated position, the one or more drive rollers 108 variously contact and drive ULD 120 that otherwise rides on the plurality of conveyance rollers 106. Other types of PDUs, which can also be used in various embodiments of the present disclosure, may include a drive roller that is held or biased in a position above the conveyance surface by a spring. PDUs as disclosed herein may be any type of electrically powered rollers that may be selectively energized to propel or drive ULD 120 in a desired direction over cargo deck 112 of the aircraft. The plurality of trays 104 may further support a plurality of restraint devices 114. In various embodiments, each of the plurality of restraint devices 114 may be configured to rotate downward as ULD 120 passes over and along conveyance surface 102. Once ULD 120 passes over any such one of the plurality of restraint devices 114, such restraint device 114 returns to its upright position, either by a motor driven actuator or a bias member (e.g., a spring), thereby restraining or preventing ULD 120 from translating in the opposite direction.

In various embodiments, cargo handling system 100 may include a system controller 130 in communication with each of the plurality of PDUs 110 via a plurality of channels 132. Each of the plurality of channels 132 may be a data bus, such as, for example, a controller area network (CAN) bus. An operator may selectively control operation of the plurality of PDUs 110 using the system controller 130. In various embodiments, system controller 130 may be configured to selectively activate or deactivate the plurality of PDUs 110. Thus, cargo handling system 100 may receive operator input through system controller 130 to control the plurality of PDUs 110 in order to manipulate movement of ULD 120 over conveyance surface 102 and into a desired position on cargo deck 112. In various embodiments, system controller 130 may include a general-purpose processor, a digital signal processor (DSP), an application specific integrated circuit (ASIC), a field programmable gate array (FPGA) or some other programmable logic device, discrete gate or transistor logic, discrete hardware components, or any combination thereof. Cargo handling system 100 may also include a power source 126 configured to supply power to the plurality of PDUs 110 or to the plurality of restraint devices 114 via one or more power busses 128. System controller 130 may be complimented by or substituted with an agent-based control system, whereby control of each PDU and associated componentry—e.g., the restraint devices—is performed by individual unit controllers associated with each of the PDUs and configured to communicate between each other.

Figure 2:
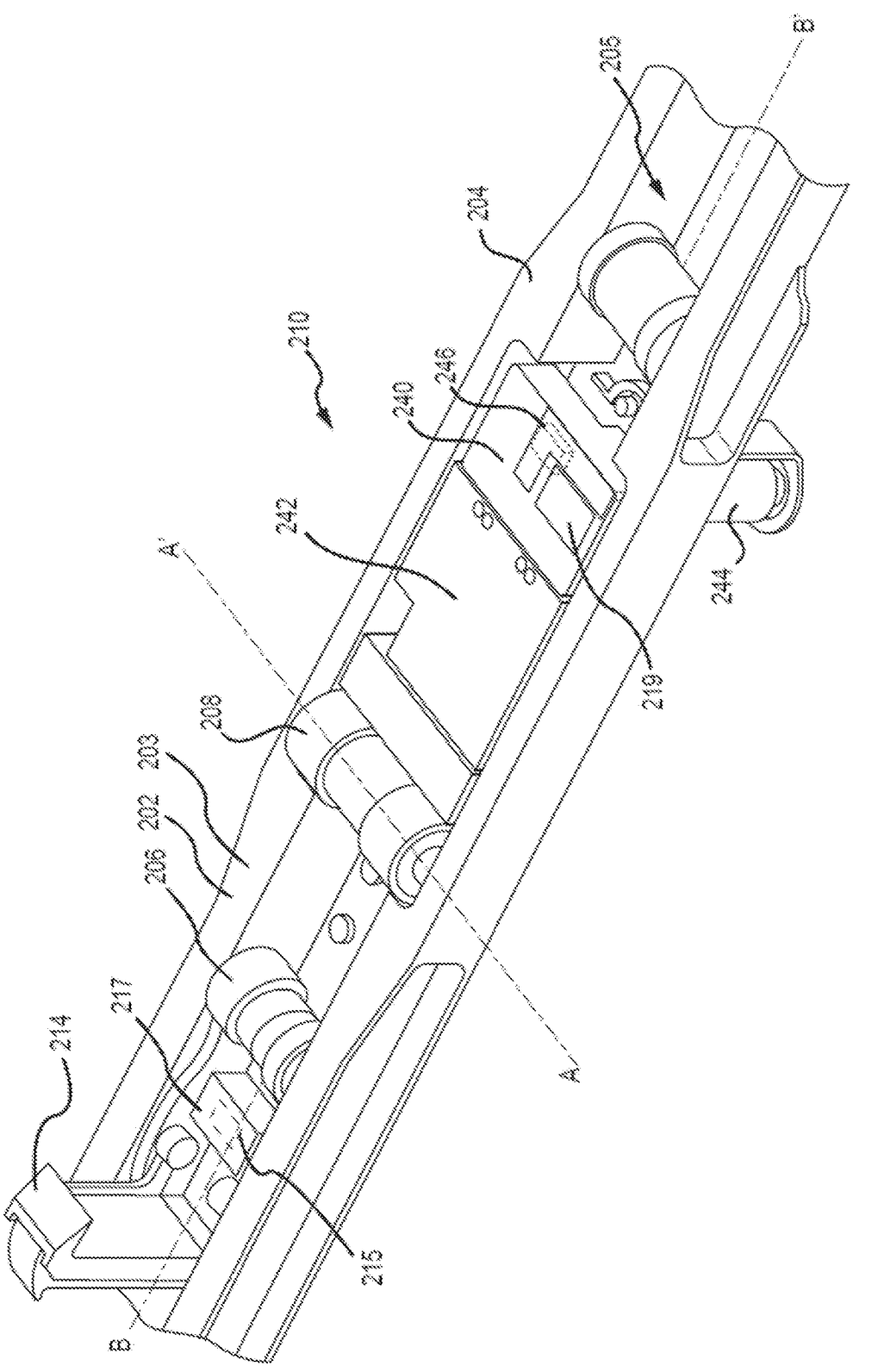
FIG. 2 illustrates a portion of a cargo handling system, in accordance with various embodiments.

Referring now to FIG. 2, a PDU 210, such as for example, one of the plurality of PDUs 110 described above with reference to FIG. 1B, is illustrated disposed in a tray 204, in accordance with various embodiments. PDU 210 may rotate drive roller 208 in one of two possible directions (e.g., clockwise or counterclockwise) to propel the ULD in a direction parallel to the longitudinal axis B-B' of tray 204. PDU 210 may comprise a unit controller 240, a unit motor 242 and a drive roller 208 mounted within an interior section 205 of the tray 204. Drive roller 208 may comprise a cylindrical wheel coupled to a drive shaft and configured to rotate about an axis A-A'. Drive roller 208 may be in mechanical communication with unit motor 242, which may be, for example, an electromagnetic, electromechanical or electrohydraulic actuator or other servomechanism. PDU 210 may further include gear assemblies and other related components for turning or raising drive roller 208 so that drive roller 208 may extend, at least partially, above a conveyance surface 202 which, in various embodiments, may be defined as the uppermost surface 203 of the tray 204. At least partial extension of drive roller 208 above conveyance surface 202 facilitates contact between drive roller 208 and a lower surface of a ULD, such as, for example, ULD 120 described above with reference to FIG. 1B. In various embodiments, unit controller 240 is configured to control operation of drive roller 208. Unit controller 240 may include a processor and a tangible, non-transitory memory. The processor may comprise one or more logic modules that implement logic to control rotation and elevation of drive roller 208. In various embodiments, PDU 210 may comprise other electrical devices to implement drive logic. In various embodiments, a connector 244 is used to couple the electronics of PDU 210 to a power source and a system controller, such as, for example, system controller 130 described above with reference to FIG. 1B. Connector 244 may have pins or slots and may be configured to couple to a wiring harness having pin programing. Unit controller 240 may be configured to receive commands from the system controller through connector 244 in order to control operation of unit motor 242.

In addition, a restraint device 214, such as, for example, one of the plurality of restraint devices 114 described above with reference to FIG. 1B, is illustrated as disposed within tray 204 and configured to operate between a stowed position, whereby the ULD may pass over the restraint device, and a deployed position (as illustrated), whereby the ULD is restrained or prevented from translation in a longitudinal direction (e.g., along a longitudinal axis B-B') without restraint device 214 first being returned to the stowed position. Restraint device 214 includes a restraint controller 215 and a restraint motor 217. In various embodiments, restraint device 214 may be in mechanical communication with restraint motor 217, which may be, for example, an electromagnetic, electromechanical or electrohydraulic actuator or other servomechanism. In various embodiments, restraint controller 215 is configured to control operation of restraint device 214. Restraint controller 215 may include a processor and a tangible, non-transitory memory. The processor may comprise one or more logic modules that implement logic to control operation of restraint device 214 between the stowed and the deployed positions.

In various embodiments, PDU 210 may also include a radio frequency identification device or RFID device 246, or similar device, configured to store, transmit or receive information or data—e.g., operational status or location data. Additionally, a ULD sensor 219 may be disposed within the tray 204 and configured to detect the presence of a ULD as the ULD is positioned over or proximate to PDU 210 or restraint device 214. In various embodiments, ULD sensor 219 may include any type of sensor capable of detecting the presence of a ULD. For example, in various embodiments, ULD sensor 219 may comprise a proximity sensor, a capacitive sensor, a capacitive displacement sensor, a Doppler effect sensor, an eddy-current sensor, a laser rangefinder sensor, a magnetic sensor, an active or passive optical sensor, an active or passive thermal sensor, a photocell sensor, a radar sensor, a sonar sensor, a lidar sensor, an ultrasonic sensor or the like.

Figure 3:
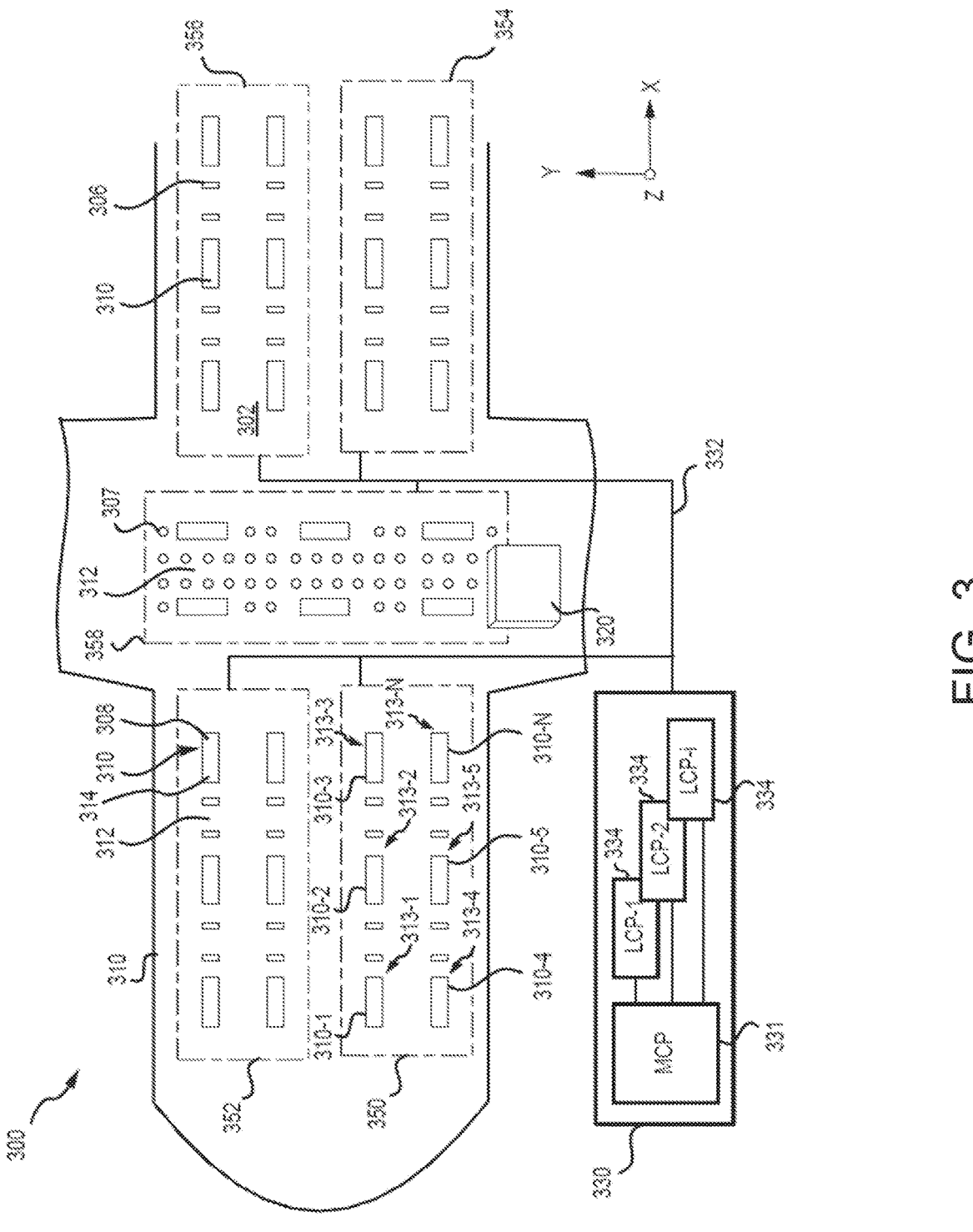
FIG. 3 illustrates a schematic view of a cargo deck having a cargo handling system with a plurality of PDUs, in accordance with various embodiments.

Referring now to FIG. 3, a schematic view of a cargo handling system 300 positioned on a cargo deck 312 of an aircraft is illustrated, in accordance with various embodiments. Cargo deck 312 may comprise a plurality of PDUs 310, generally arranged in a matrix configuration about cargo deck 312. Associated with each of the plurality of PDUs 310 may be one or more drive rollers 308 and a restraint device 314. In various embodiments, the plurality of PDUs 310, the one or more drive rollers 308 and restraint device 314 share similar characteristics and modes of operation as PDU 210, drive roller 208 and restraint device 214 described above with reference to FIG. 2. Each of the one or more drive rollers 308 is generally configured to selectively protrude from a conveyance surface 302 of cargo deck 312 in order to engage with a surface of a ULD 320 as it is guided onto and over conveyance surface 302 during loading and unloading operations. A plurality of conveyance rollers 306 may be arranged among the plurality of PDUs 310 in a matrix configuration as well. The plurality of conveyance rollers 306 may comprise passive elements, and may include roller ball units 307 that serve as stabilizing and guiding apparatus for ULD 320 as it is conveyed over the conveyance surface 302 by the plurality of PDUs 310.

In various embodiments, cargo handling system 300 or, more particularly, conveyance surface 302, is divided into a plurality of sections. As illustrated, for example, conveyance surface 302 may include a port-side track and a starboard-side track along which a plurality of ULDs may be stowed in parallel columns during flight. Further, conveyance surface 302 may be divided into an aft section and a forward section. Thus, the port-side and starboard-side tracks, in various embodiments and as illustrated, may be divided into four sections—e.g., a forward port-side section 350, a forward starboard-side section 352, an aft port-side section 354 and an aft starboard-side section 356. Conveyance surface 302 may also have a lateral section 358, which may be used to transport ULD 320 onto and off of conveyance surface 302 as well as transfer ULD 320 between the port-side and starboard-side tracks and between the aft section and the forward section. The configurations described above and illustrated in FIG. 3 are exemplary only and may be varied depending on the context, including the numbers of the various components used to convey ULD 320 over conveyance surface 302. In various embodiments, for example, configurations having three or more track configurations, rather than the two-track configuration illustrated in FIG. 3, may be employed.

Each of the aforementioned sections—i.e., the forward port (left)-side section 350, the forward starboard (right)-side section 352, the aft port (left)-side section 354, and the aft starboard (right)-side section 356—may include one or more of the plurality of PDUs 310. Each one of the plurality of PDUs 310 has a physical location on the conveyance surface 302 that corresponds to a logical address within the cargo handling system 300. For purposes of illustration, the forward port-side section 350 is shown having a first PDU 310-1, a second PDU 310-2, a third PDU 310-3, a fourth PDU 310-4, a fifth PDU 310-5 and an N-th PDU 310-N (69.7 pound force). The aforementioned individual PDUs are located, respectively, at a first location 313-1, a second location 313-2, a third location 313-3, a fourth location 313-4, a fifth location 313-5 and an N-th location 313-N (70.4 pound force). In various embodiments, the location of each of the aforementioned individual PDUs on conveyance surface 302 may have a unique location (or address) identifier, which, in various embodiments, may be stored in an RFID device, such as, for example, RFID device 246 described above with reference to FIG. 2.

In various embodiments, an operator may control operation of the plurality of PDUs 310 using one or more control interfaces of a system controller 330, such as, for example, system controller 130 described above with reference to FIG. 1B. For example, an operator may selectively control the operation of the plurality of PDUs 310 through an interface, such as, for example, a master control panel (MCP) 331. In various embodiments, cargo handling system 300 may also include one or more local control panels (LCP) 334. In various embodiments, master control panel 331 may communicate with local control panels 334. Master control panel 331 or local control panels 334 may also be configured to communicate with or send or receive control signals or command signals to or from each of the plurality of PDUs 310 or to a subset of the plurality of PDUs 310, such as, for example, the aforementioned individual PDUs described above with reference to forward port-side section 350. For example, a first local control panel LCP-1 may be configured to communicate with the PDUs residing in forward port-side section 350, a second local control panel LCP-2 may be configured to communicate with the PDUs residing in forward starboard-side section 352, and one or more additional local control panels LCP-i may be in communication with the PDUs of one or more of aft port-side section 354, aft starboard-side section 356, and lateral section 358. Thus, master control panel 331 or local control panels 334 may be configured to allow an operator to selectively engage or activate one or more of the plurality of PDUs 310 to propel ULD 320 along conveyance surface 302.

In various embodiments, each of the plurality of PDUs 310 may be configured to receive a command from master control panel 331 or one or more of the local control panels 334. In various embodiments, the commands may be sent or information exchanged over a channel 332, which may provide a communication link between system controller 330 and each of the plurality of PDUs 310. In various embodiments, a command signal sent from system controller 330 may include one or more logical addresses, each of which may correspond to a physical address of one of the plurality of PDUs 310. Each of the plurality of PDUs 310 that receives the command signal may determine if the command signal is intended for that particular PDU by comparing its own address to the address included in the command signal.

Figure 4:
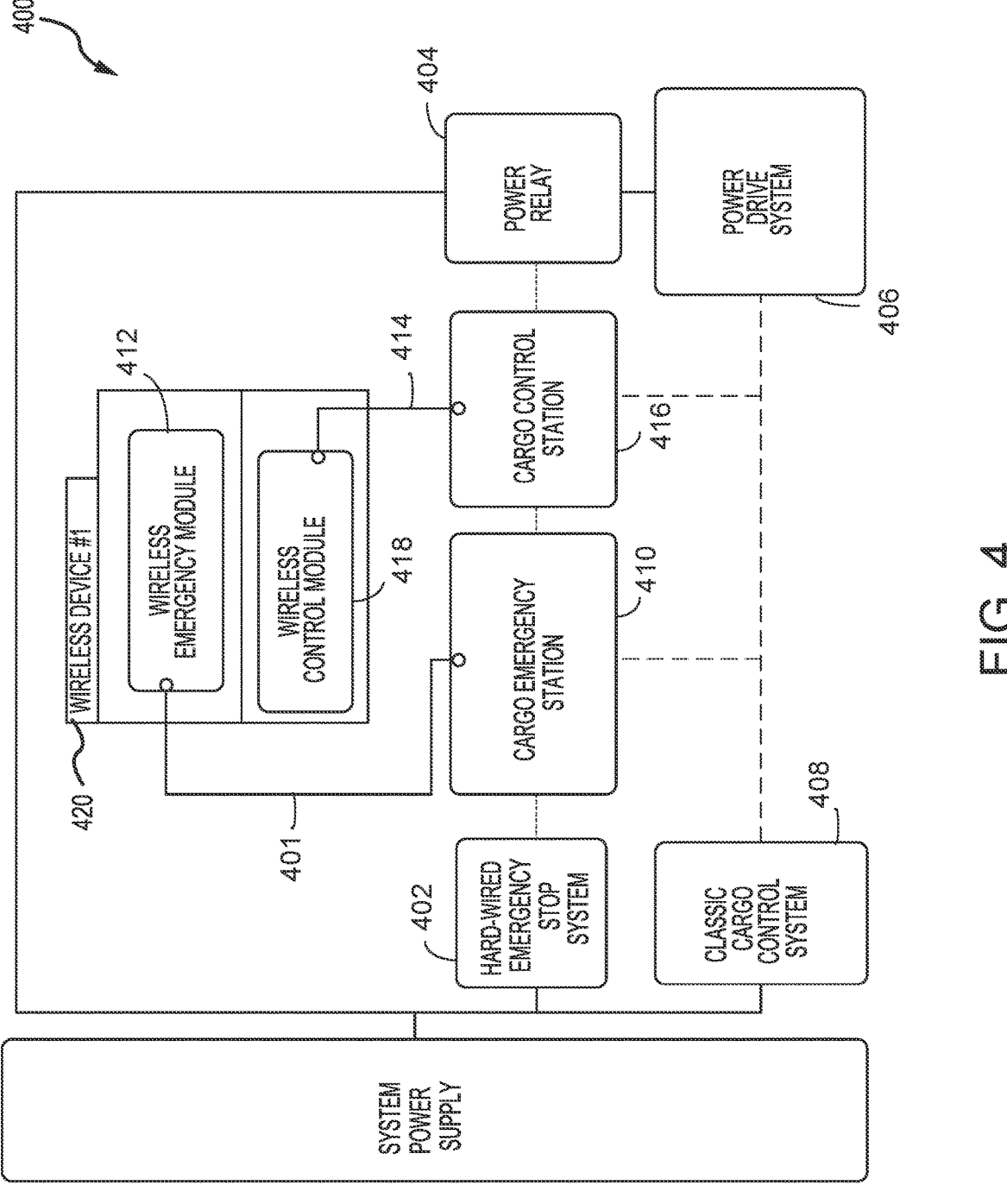
FIG. 4 illustrates a wireless cargo handling real time localization system, in accordance with various embodiments.

Referring now to FIG. 4, cargo handling system 300 includes a wireless cargo handling real time localization system 400. Wireless cargo handling real time localization system 400, referred to as system 400 below, includes a wireless cargo emergency stop system 401, a hard-wired emergency stop system 402, a power relay 404, a power drive system 406, a control panel 408, a cargo emergency station (CES) 410, a wireless emergency module (WEM) 412, a wireless control system 414, a cargo control station (CCS) 416, and a wireless control module (WCM) 418. WEM 412 and WCM 418 may be part of a wireless device 420 that is used by an operator.

Wireless cargo emergency stop system 401 may be integrated with hard-wired emergency stop system 402 and power relay 404. Wireless cargo emergency stop system 401 removes power to power drive system 406, in response to being activated, while control panel 408 can still communicate with the rest of the system. This operation prevents harm to the operators. CES 410 is configured to directly communicate with one or more wireless devices (e.g., wireless device 420). WEM 412 communicates wirelessly with an associated CES 410. WEM 412 may be used to communicate additional information to system 400, including but no limited to, real time localization information. That is, WEM 412 may communicate data indicating the real time location of wireless device 420, and therefore, the operator using wireless device 420.

Wireless cargo emergency stop system 401 may be configured to communicate on a range of frequencies depending on the cargo handling system 300 requirements. For instance, CES 410 and WEM 412 may be configured to communicate over the various standards, such as IEEE802.11 Wi-Fi variants, IEEE 802.15.4 ZigBee, IEEE 802.15.1 Bluetooth, etc. In various embodiments, the compatible bands may be closer to the visible spectrum such as the infrared spectrum.

Depending on the communication standard wireless cargo emergency stop system 401 is using, the standard may include its own security protocol. For example, if their network is using IEEE 802.11 Wi-Fi standard, then wireless cargo emergency stop system 401 can utilize the latest security standards associated with IEEE 802.11 communication such as Wi-Fi Protected Access 3 (WPA3). Security is assumed when utilizing a closed network.

The location information received from WEM 412 may be used by wireless control system 414 to identified allowed operations with cargo handling system 300. CCS 416 is electro-mechanically coupled to the aircraft, and is configured to translate information from a paired wireless control module (WCM) 418 to the cargo systems internal serial networks. If no other designated wireless access point exists, the CCS 416 could act as the wireless access point for the wireless control system. Similarly to CES 410, CCS 416 is connected in series with hard-wired emergency stop system 402, and CES 410. Therefore, either hard-wired emergency stop system 402, CES 410, or CCS 416 can directly induce an emergency stop function based on the real time location of the operator or wireless device 420.

Additional details of each of the components within wireless cargo handling real time localization system 400 may be found U.S. patent application Ser. No. 18/119,116, filed Mar. 8, 2023, and entitled "Wireless Emergency Stop System for Cargo Applications" which is incorporated herein by reference in its entirety and for all purposes, except to the extent that the incorporated material is inconsistent with the express disclosure herein, in which case the language in this disclosure shall control.

Figures 5A, 5B:
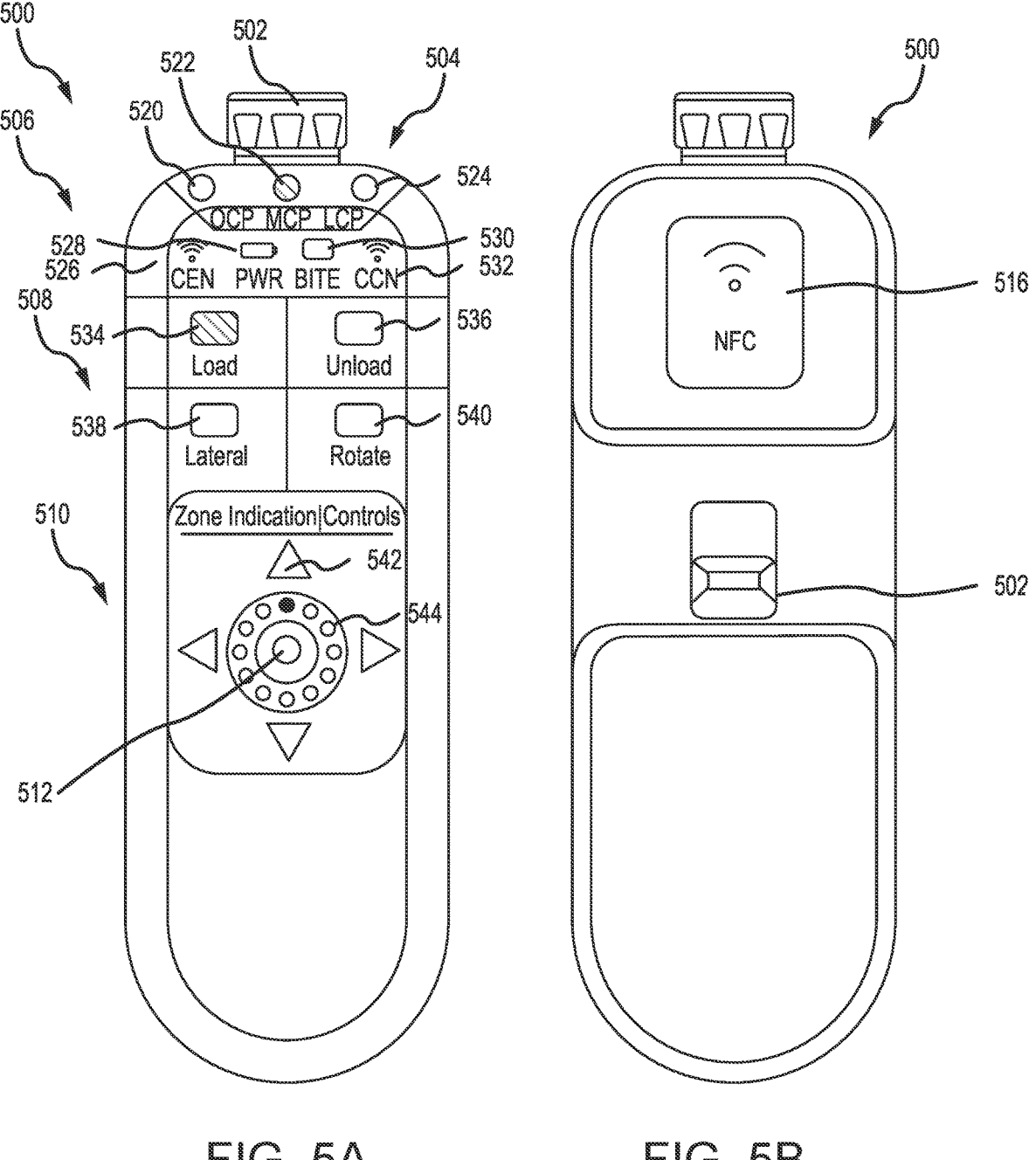
FIGS. 5A, 5B, 5C, and 5D illustrate wireless control devices for use with wireless cargo handling real time localization system, in accordance with various embodiments.
Figure 5D:
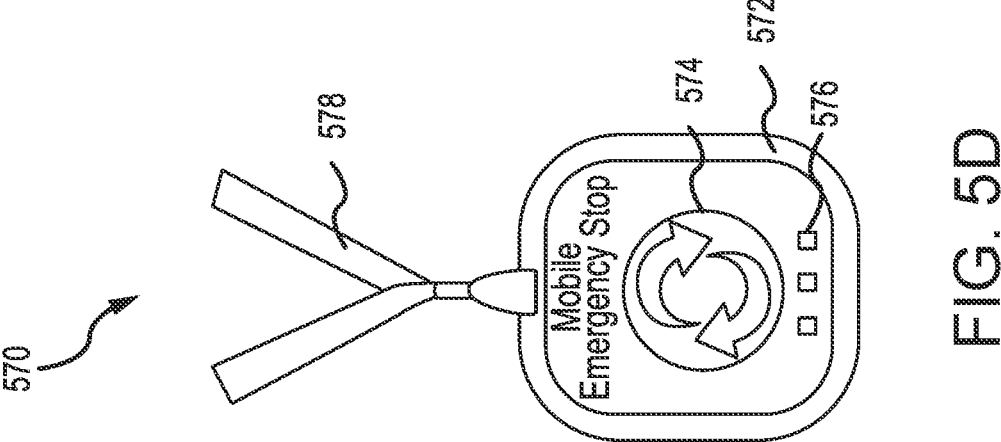
Figure 5C:
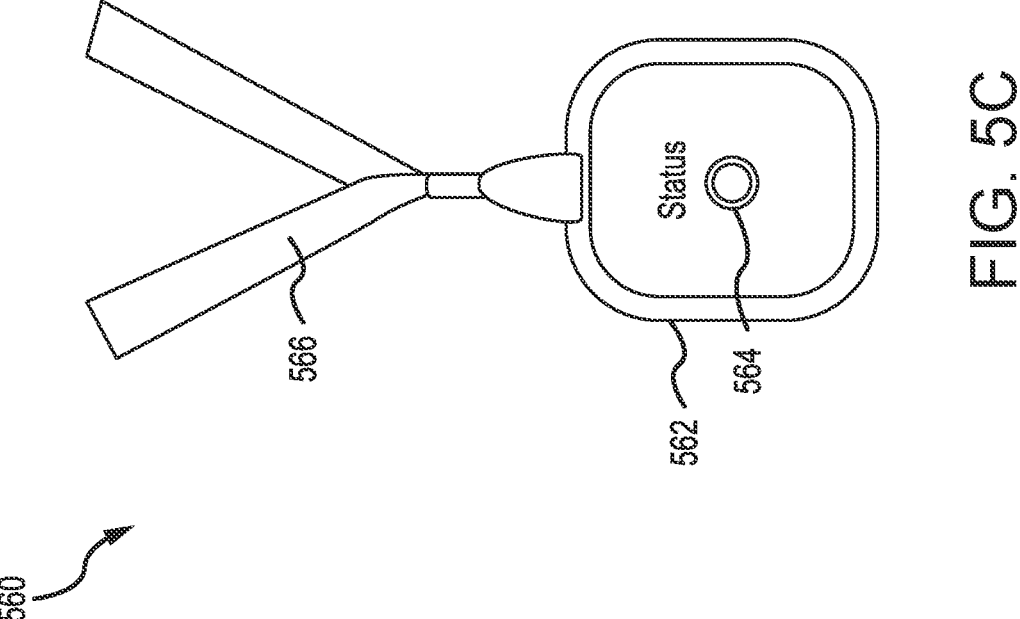

Referring now to FIGS. 5A-5D, wireless control devices for use with wireless cargo handling real time localization system 400 are illustrated, in accordance with various embodiments. FIGS. 5A and 5B illustrate a real-time location system (RTLS) wireless control device, referred to as RTLS device 500, FIG. 5C illustrates an RTLS tag 560, and FIG. 5D illustrates an RTLS emergency device 570. RTLS device 500 includes an emergency stop button 502, control mode indicators 504, status indicators 506, cargo operations indicators 508, a zone indicator 510, an input 512, a safety trigger 514, and a near field communication (NFC) chip 516.

Emergency stop button 502, including the hardware and software, is handled by the wireless emergency module. A message is transmitted to the cargo emergency station in response to emergency stop button 502 being pressed. The message signifies an emergency condition requested from the respective device. In various embodiments, the emergency condition includes stopping cargo movement within cargo handling system 300. In various embodiments, RTLS device 500 may be deactivated in response to activation of emergency stop button 502. That is, all communication between RTLS device 500 and cargo handling system 300 is terminated resulting in cargo handling system 300 stopping all movement. In various embodiments, other actions may be taken in response to emergency stop button 502 being activated.

Control mode indicators 504 include an outside control panel (OCP) indicator 520, a master control panel (MCP) indicator 522, and a local control panel (LCP) indicator 524. Typically, cargo handling systems (e.g., cargo handling system 300) include three different types of control panels. The MCP allows for operation of the entire cargo compartment. MCP indicator 520 indicates that RTLS device 500 is configured to control the entire cargo compartment, similar to using the MCP. The LCP allows for control of the cargo handling system within a small, specific section. When this mode is engaged, the MCP can no longer control that section of the power drive system for safety reasons as well as unintended movement prevention. LCP indicator 524 indicates that RTLS device 500 is configured to control a local area, similar to using the LCP. The OCP is a panel located outside of the airplanes cargo loading system, located around where the external loader would be positioned, and allows for control of a small portion of the cargo handling system doorway area. OCP indicator 520 indicates that RTLS device 500 is configured to control doorway area, similar to using the OCP. In various embodiments, the boundaries of each of these control zones are defined and may change from system to system.

Status indicators 506 include a cargo emergency network (CEN) indicator 526, power indicator 528, a built in test equipment (BITE) indicator 530, and a cargo control network (CCN) indicator 532. CEN indicator 526 provides information relating to the cargo emergency control connectivity status, or connection status of the wireless emergency module (e.g., WEM 412). This provides an indication that RTLS device 500 is connected to the cargo emergency system, as described above in FIG. 4. Power indicator 528 provides information relating to the remaining battery life of RTLS device 500. BITE indicator 530 provides a status of RTLS device 500 itself, providing an indication of whether all systems are functioning as expected or whether there is an error within RTLS device 500. In various embodiments, more or fewer status indicators may be present. In various embodiments, each status indicator may be used for different purposes.

Cargo operations indicators 508 includes a load indicator 534, an unload indicator 536, a lateral indicator 538, and a rotate indicator 540. Load indicator 534 is active when RTLS device 500 is controlling a loading operation within the cargo handling system. Unload indicator 536 is active when RTLS device 500 is controlling an unloading operation within the cargo handling system. In various embodiments, the loading operation and the unloading operation are mutually exclusive. Accordingly, in various embodiments, load indicator 534 and unload indicator 536 may not be active at the same time. Lateral indicator 538 is active when RTLS device 500 is controlling a lateral, or side-to-side, movement of cargo in the doorway area. In various embodiments, lateral operations may require the wireless controller performing the action to be within a certain boundary of the event, as determined by system 400 and the real time location of RTLS device 500. Rotate indicator 540 is active when RTLS device 500 is controlling a rotation movement of cargo in the doorway. Rotation happens with containers that are longer than the width of the cargo system. These units of cargo may be both rotated for loading into the aircraft and rotated for unloading from the aircraft. Historically this has been the most complex cargo movement and has been accomplished with two-person operation. However, RTLS device 500, in various embodiments, may be able to operate a rotation movement by a single operator within a specified location, as determined by RTLS device 500. With the help of real time localization system components as disclosed herein, this new system can enforce a controller to be in a specific location for safe, single person operation.

Zone indicator 510 includes control indicators 542 and a plurality of orientation indicator lights 544 to indicate an orientation of RTLS device 500 and which direction is forward in cargo handling system. This can benefit the operator by indicating RTLS device 500 is properly calibrated for orientation and that the commands given will truly be with respect to the controller's orientation. In various embodiments, the operator may perform a calibration procedure to re-calibrate RTLS device 500. The plurality of orientation indicator lights 544 may be used to identify orientation angles of RTLS device 500.

Input 512 may, in various embodiments, be a joystick, a control nub, a track pad, a roller ball, a d-pad, or other input mechanism. Input 512 enables the input of vectorized commands to the cargo within the currently active zones. In various embodiments, the movement direction may be determined by the orientation of the wireless controller relative to the aircraft's orientation. In various embodiments, input 512 may control a velocity of cargo adjusting an input magnitude. In various embodiments, the direction of movement may not change in response to a change in RTLS device 500 position and/or orientation so long as input 512 is active.

Safety trigger 514 is disposed on a backside of RTLS device 500, opposite the indicators previously discussed. Safety trigger 514 provides an additional input for use by the operation. In various embodiments, input 512 may not respond until safety trigger 514 is activated. In various embodiments, safety trigger 514 may neutralize inputs received from input 512.

NFC chip 516 is located within RTLS device 500 and is configured to communicate with the cargo handling system. In various embodiments, NFC chip 516 may be used for authenticating RTLS device 500. In various embodiments, NFC chip 516 may be used for transferring data between RTLS device 500 and the cargo handling system.

Referring to FIG. 5C, RTLS tag 560 includes a body 562 and a status indicator 564. Body 562, in various embodiments, may be coupled to a lanyard 566. Body 562 includes a processor, memory, and a radio configured to communicate with the cargo handling system. Status indicator 564 is activated when RTLS tag 560 is connected to the cargo handling system. RTLS tag 560 provides an additional level of safety for anyone located within the cargo area of the aircraft. A location of RTLS tag 560 may be monitored, as discussed below in FIGS. 6A-6D, by the cargo handling system to prevent injury to a non-operator, or cargo, that is carrying RTLS tag 560.

Referring to FIG. 5D, RTLS emergency device 570 includes a body 572, an emergency button 574, and a status indicator 576. Body 572, in various embodiments, may be coupled to a lanyard 578. Body 572 includes a processor, memory, and a radio configured to communicate with the cargo handling system. Status indicator 576 is activated when RTLS emergency device 570 is connected to the cargo handling system. Emergency button 574 provides similar functionality to emergency stop button 502. RTLS emergency device 570 provides an additional level of safety for anyone located within the cargo area of the aircraft. A location of RTLS emergency device 570 may be monitored, as discussed below in FIGS. 6A-6D, by the cargo handling system to prevent injury to a non-operator that is carrying RTLS emergency device 570.

Figures 6A, 6B:
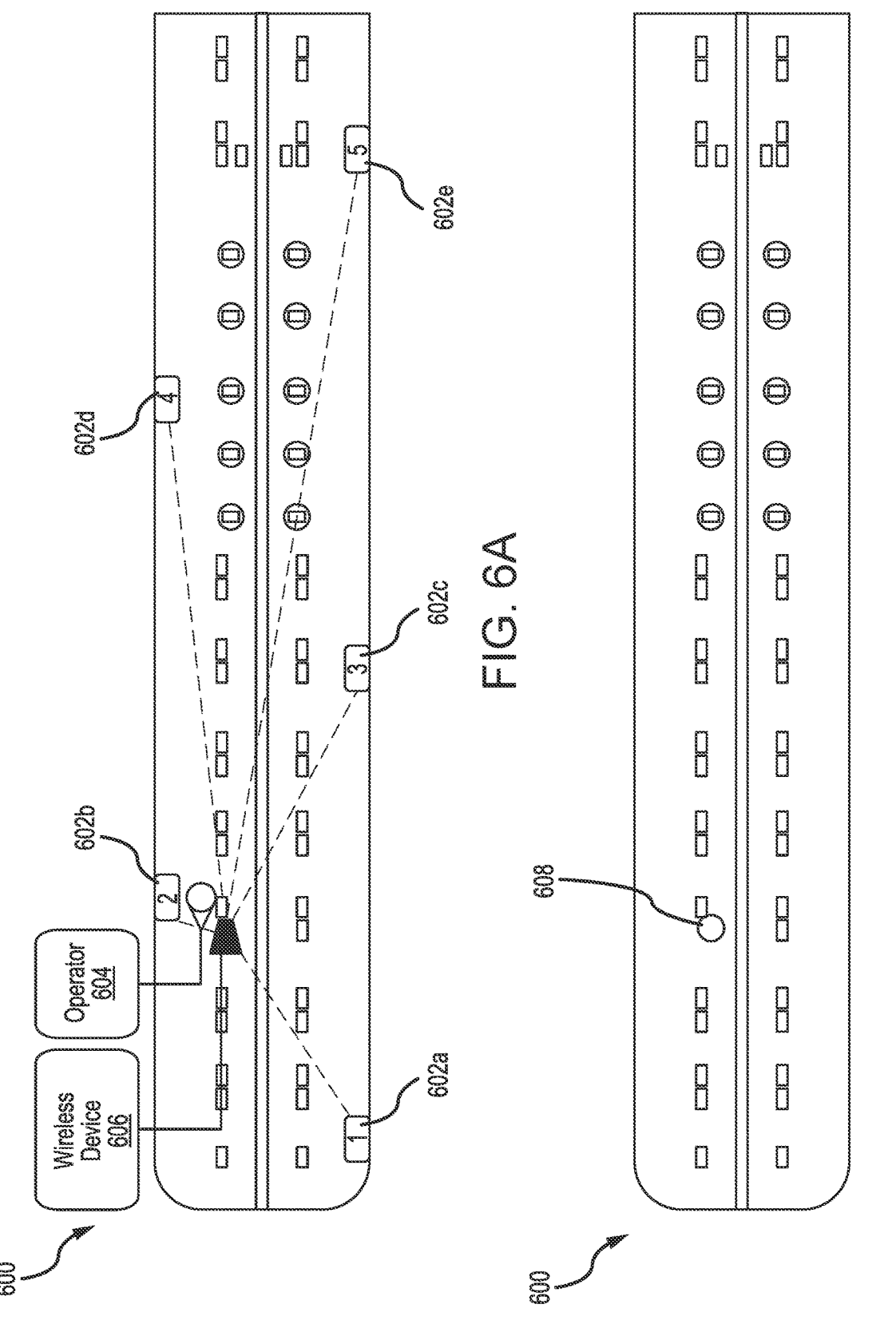
FIGS. 6A, 6B, 6C, and 6D illustrate a cargo handling system that utilizes a real-time location system to track wireless cargo devices, in accordance with various embodiments.
Figure 6C:
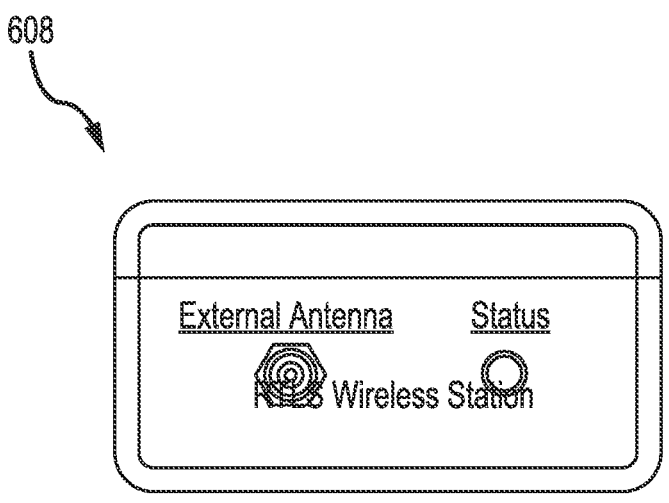
Figure 6D:
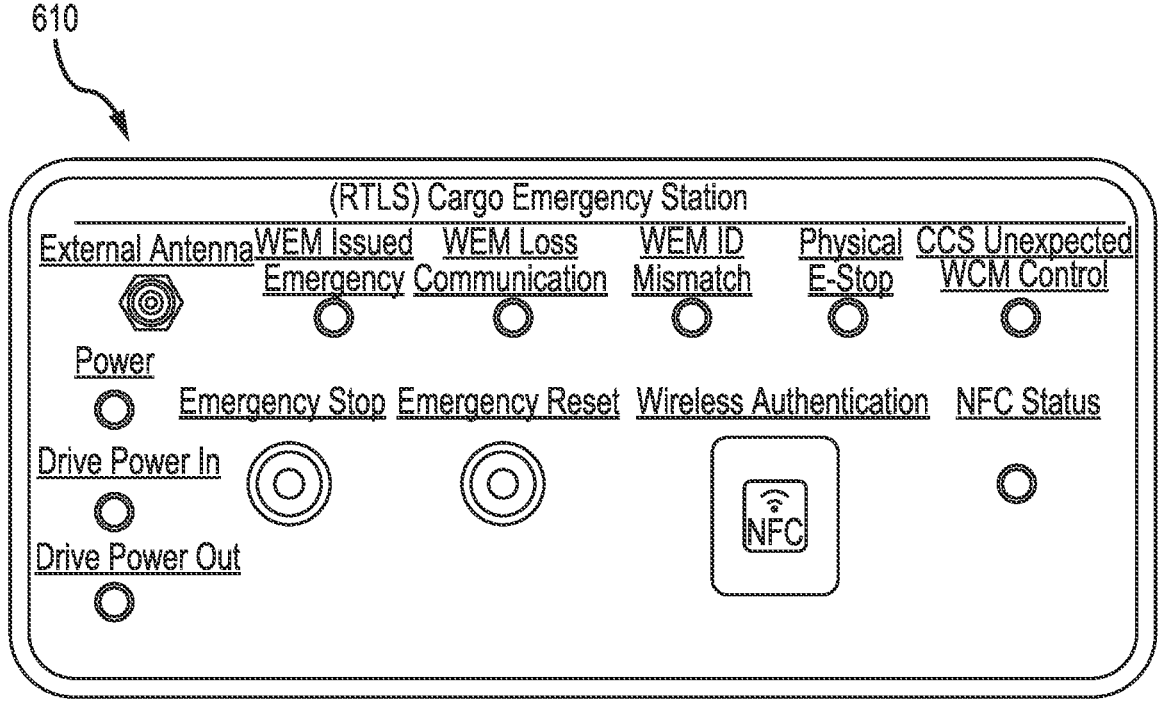

Referring now to FIGS. 6A-6D, illustrate a cargo handling system 600 that utilizes a real-time location system to track wireless cargo devices, in accordance with various embodiments. In various embodiments, cargo handling system 600 may be an example of cargo handling system 300 described above in FIG. 3. Cargo handling system 600 includes one or more real-time location system (RTLS) anchors. The one or more RTLS anchors, in various embodiments, may be stand alone devices or they may be integrated into wireless stations (e.g., CES 410, CCS 416). FIGS. 6A and 6B illustrate cargo handling system 600 including a plurality of RTLS anchors 602 and an operator 604 using a wireless device 606. FIG. 6C illustrates a RTLS wireless station 608 including an RTLS anchor 602. FIG. 6D illustrates a RTLS emergency station 610 including an RTLS anchor 602. In various embodiments, wireless device may be an example RTLS device 500.

In the illustrated embodiment, cargo handling system 600 includes five RTLS anchors 602 that are located throughout cargo handling system 600. A first RTLS anchor 602*a*, a second RTLS anchor 602*b*, a third RTLS anchor 602*c*, a fourth RTLS anchor 602*d*, and a fifth RTLS anchor 602*c*. Each RTLS anchor 602 transmits data that allows wireless device 606 to determine its own real-time location with respect to cargo handling system 600. As wireless device 606 moves within cargo handling system 600, it receives the transmitted data from one or more of the RTLS anchors 602. In an empty cargo handling system 600, as illustrated, wireless device 606 is able to receive the transmitted data from all five RTLS anchors 602. Wireless device 606 is able to more precisely determine its real-time location with access to signals from multiple RTLS anchors 602. In other words, the more RTLS anchors 602 that wireless device 606 is able to communicate with, the more precise the real-time location of wireless device 606 will be. Wireless device 606 then transmits its real-time location to cargo handling system 600 so that cargo handling system 600 knows the location of wireless device 606, as illustrated in FIG. 6B. In various embodiments, each RTLS anchor 602 transmits a message including a time stamp. In various embodiments, each RTLS anchor 602 transmits the message about 5 times per second, to about 20 times per second, and more specifically, about 10 times per second.

In various embodiments, each RTLS anchor 602 may used ultra-wideband wireless technology to transmit data to wireless device 606 that is held by operator 604. Ultra-wideband (UWB) is a wireless technology that transmits data over a wide range of frequencies with very low power levels. UWB devices transmit short-duration pulses that spread out over a wide frequency range, which makes them less susceptible to interference and enables high-precision ranging and localization. The RTLS anchors 602 are placed in known locations. As wireless device 606 receives the transmitted data, over UWB, wireless device 606 is able to measure the time it takes for the UWB signals to travel between the RTLS anchors 602 and wireless device 606. Wireless device 606 is able to use this information to determine its own position in three-dimensional space using hyperbolic position measurement. That is, wireless device 606 is able to determine its position based on distances from multiple RTLS anchors 602. In various embodiments, the hyperbolic position measurement includes trilateration (i.e., based on 3 RTLS anchors 602) and multilateration (i.e., based on four or more RTLS anchors 602).

Using UWB technology provides several advantages for real-time localization of wireless device 606 in cargo system 600. UWB transmissions allow for high accuracy and real-time location tracking. UWB can be used for ranging and localization by measuring the time-of-flight of the radio pulses between two or more devices. Anchoring a UWB device to a known position, allows other UWB devices to localize themselves in relation to the anchor device position. The trilateration, or multilateration, process can be made more accurate by using additional anchors, improving the quality of the time of flight measurements, and reducing sources of interference. With three or more anchor points, the location can be represented in three dimensions (x,y,z).

UWB has relatively low power consumption when compared to other wireless technologies such as Wi-Fi which makes it ideal for battery powered devices. The combination of operating in a high frequency range, using a very short pulse duration, and spreading the signal energy across a wide frequency band makes UWB signals more resistant to interference from other wireless technologies. UWB can transmit data at very high rates, which can be helpful in certain cases requiring high bandwidth. UWB signals are difficult to intercept or eavesdrop on.

Referring to FIG. 6C, RTLS wireless station 608 including an RTLS anchor 602 may be used with wireless device 606. RTLS wireless station 608 includes a UWB module that transmits UWB signals to wireless devices 606 and receives a response including a location from each wireless device 606. RTLS wireless station 608 further includes one or more microcontrollers or processors to process the received location data and store the received location of each individual wireless device 606. This enables cargo handling system 600 to track each wireless device 606. The controller may include one or more processors and memory to store the location data, as previously discussed with respect to system controller 130. The microcontroller may additionally communicate with other components of cargo handling system 600. Cargo handling system 600 may include a plurality of RTLS wireless stations 608.

Referring to FIG. 6D, RTLS emergency station 610 including an RTLS anchor 602 may be used with wireless device 606. RTLS emergency station 610 includes similar components to RTLS wireless station 608 with the addition of emergency functions. At least one RTLS emergency stations 610 should be placed in cargo handling system 600.

Figures 7A, 7B:
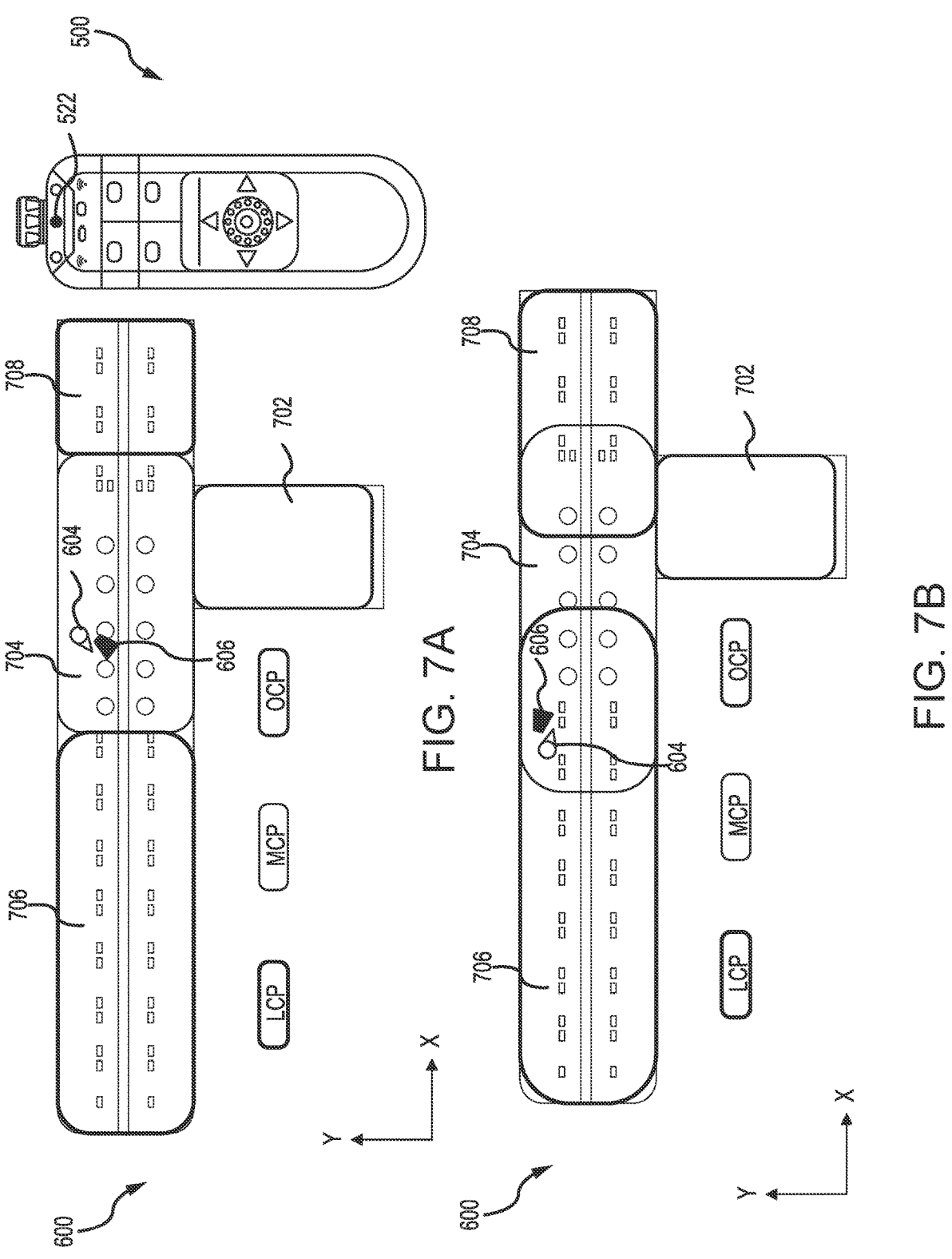
FIGS. 7A and 7B illustrate location dependent control modes available based on the real-time location of a wireless controller in a cargo handling system, in accordance with various embodiments.

Referring now to FIGS. 7A and 7B, location dependent control modes available based on the real-time location of wireless device 606 in cargo handling system 600 is illustrated, in accordance with various embodiments. Cargo handling system 600 includes a first local control zone 704, a second local control zone 706, and a third local control zone 708. A loading system 702 (e.g., loader, ground support system, etc.) may be located adjacent a doorway area, including first local control zone 704. Generally, an inside control panel would be used to control each of local control zones 704, 706, 708, an outside control panel may be used to control local control zone 704 adjacent loading system 702, and a master control panel may be used to control all zones. Using RTLS device 500, an operator may operate in a master control panel (MCP) mode, as indicated by MCP indicator 522. This allows the operator to control zones 704, 706, 708. Alternatively or in addition, based on the real-time location of RTLS device 500, the operator may be limited to operating at least one of first local control zone 704, second local control zone 706, or third local control zone 708.

As illustrated in FIG. 7A, each control zone is separate and distinct from adjacent control zones. Operator 604 in FIG. 7A may operate in master control mode or be limited to controlling first local control zone 704, based on the real-time location of wireless device 606.

As illustrated in FIG. 7B, each control zone may overlap adjacent control zones. Operator 604 in FIG. 7A may operate in master control mode or be limited to controlling first local control zone 704 or second local control zone 706, based on the real-time location of wireless device 606. In various embodiments, operator 604 may select which local control zone to control. In various embodiments, wireless device 606 enable operator 604 to operate both first local control zone 704 and second local control zone 704. In various embodiments, control may be transferred from first local control zone 704 to second local control zone 704 in response to wireless device 606 moving closer to an outer boundary of first local control zone 704 (e.g., in the negative x-direction).

Figures 8A, 8B:
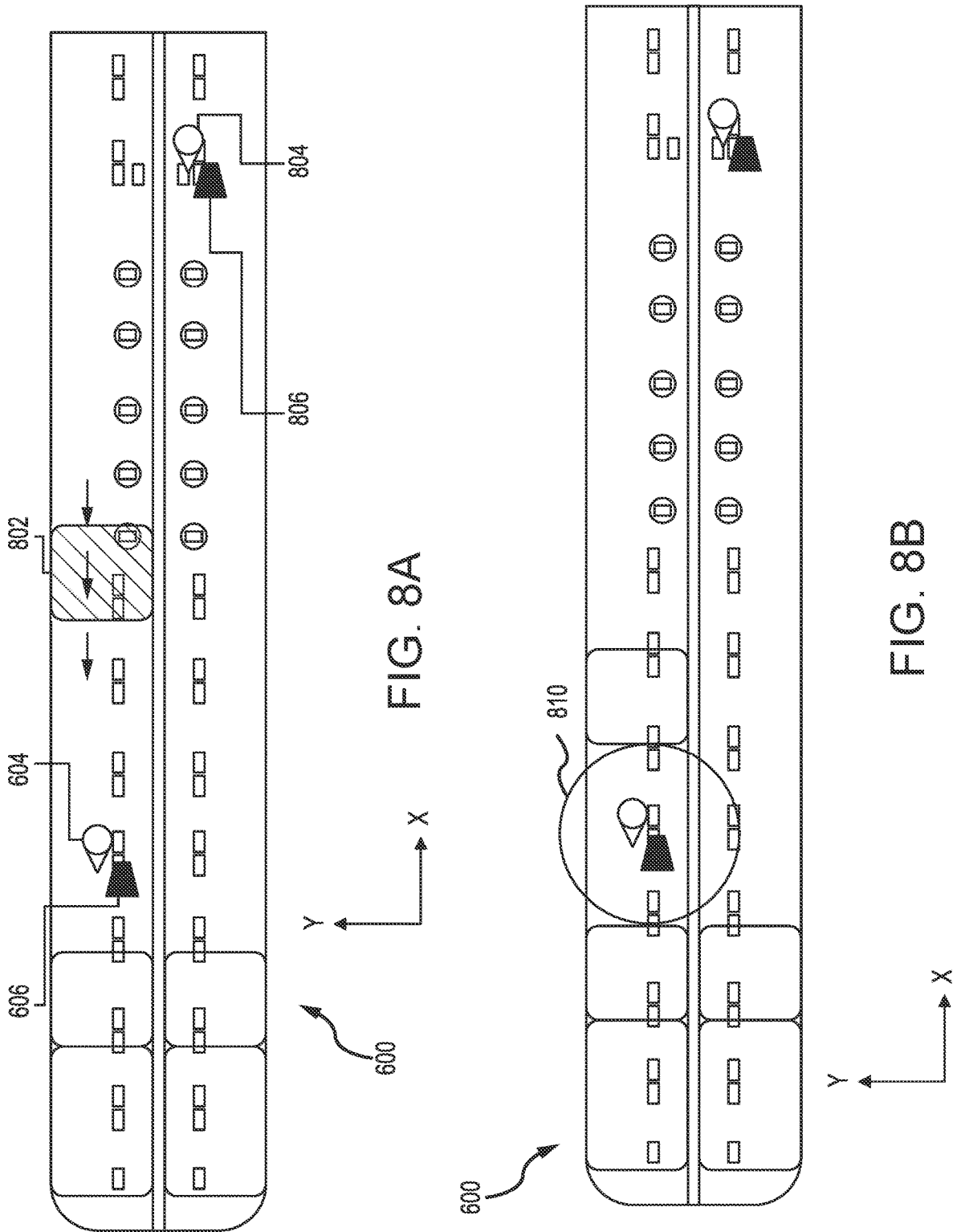
FIGS. 8A and 8B illustrate automatic cargo emergency braking of cargo in response to the real-time location of a wireless controller in a cargo handling system, in accordance with various embodiments.

Referring now to FIGS. 8A and 8B, automatic cargo emergency braking of cargo in response to the real-time location of wireless device 606 in cargo handling system 600 is illustrated, in accordance with various embodiments. FIGS. 8A and 8B illustrate a first operator 604 with a first wireless device 606 and a second operator 804 with a second wireless device 806. In various embodiments, second wireless controller may be similar to first wireless device 606. In various embodiments, first wireless device 606 may be an example of RTLS tag 560 or RTLS emergency device 570.

The cargo handling system (e.g., cargo handling system 300) is aware of the positions of both first wireless device 606 and second wireless device 806, and therefore the position of first operator 604 and second operator 804. As illustrated in FIG. 8A, second operator 804 is controlling cargo handling system 300 to move a unit load device (ULD) 802 toward the front of the aircraft (e.g., in the negative x-direction). First operator 604 is located in the path of movement of ULD 802, and possibly hidden from view of second operator 804.

The cargo handling system is able to identify areas a potential points of danger based on the real-time location of the wireless devices. In various embodiments, the potential point of danger may be a radius around the wireless device.

As illustrated in FIG. 8B, a potential point of danger 810 is illustrated as a circle around first operator 604 and first wireless device 606. The cargo handling system stops the movement of ULD 802 prior to entering potential point of danger 810. In various embodiments, the radius of the circle may be about 3 feet (about 0.914 meter) to about 5 feet (about 1.52 meters).

Referring now to FIGS. 9A-9D, location specific cargo operations enabled based on the real-time location of wireless device 606 in cargo handling system 600 is illustrated, in accordance with various embodiments. Operator 604 using wireless device 606 is moving a unit load device (ULD) 902 using cargo handling system 600. ULD 902 will be rotated within cargo handling system 600 for proper storage. Rotation of cargo is a complex movement and can be difficult to accomplish given traditional control systems. Typically, operator 604 is near the door during these rotation operations. This more complex movement can not only cause harm to operators unaware of their position relative to the cargo's rotating path, but also to the aircraft's airframe itself. Along with human danger, damage to the airframe would be a failure of cargo handling system 600. To avoid these problems, typically two operators are present to perform rotation movements of cargo. Using wireless device 606 (e.g., RTLS device 500) a single operator 604 may safely perform a cargo rotation maneuver because operator 604 is able to move around the cargo. However, in various embodiments, cargo handling system 600 may enforce a zone of control 904 for performing a rotation operation.

Figures 9A, 9B:
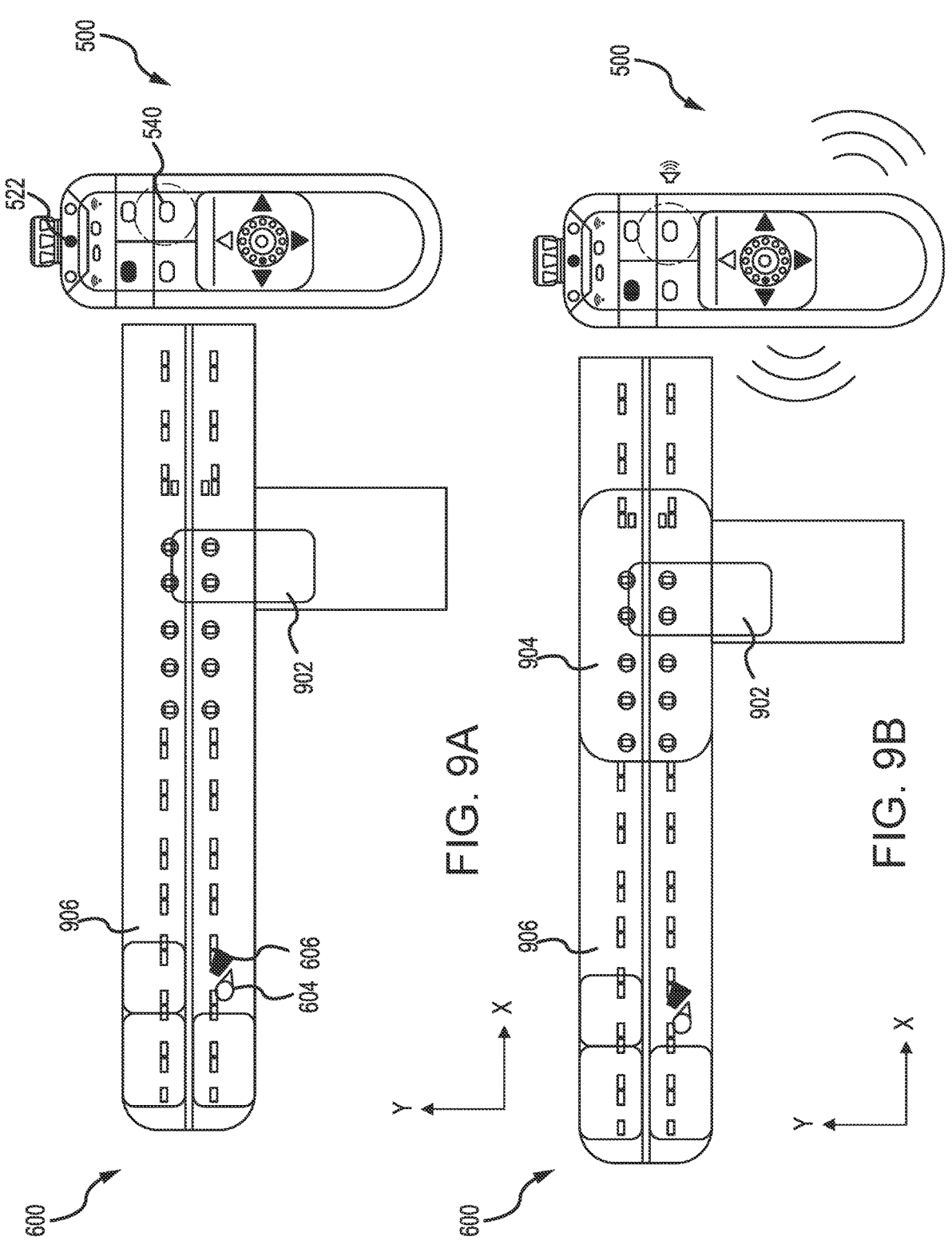
FIGS. 9A, 9B, 9C, and 9D illustrate location specific cargo operations enabled based on the real-time location of a wireless controller in cargo handling system, in accordance with various embodiments.

As illustrated in FIG. 9A, operator 604 is using RTLS device 500 that is in master control mode as indicated by MCP indicator 522. Cargo handling system 600 may prevent operator 604 from selecting the rotation function, as indicated by rotate indicator 540, because operator 604 is not within zone of control 904. As illustrated in FIG. 9B, zone of control 904 is adjacent the cargo door and where ULD 902 is currently being loaded. In various embodiments, RTLS device 500 may sound an audible alarm and/or vibrate to indicate to operator 604 that RTLS device 500 is not within zone of control 904 and therefore not able to perform a rotation movement. In various embodiments, zone of control 904 may be the same of a local control zone (e.g., local control zone 704). In various embodiments, zone of control 904 may have boundaries that are distinct from local control zones.

Figures 9C, 9D:
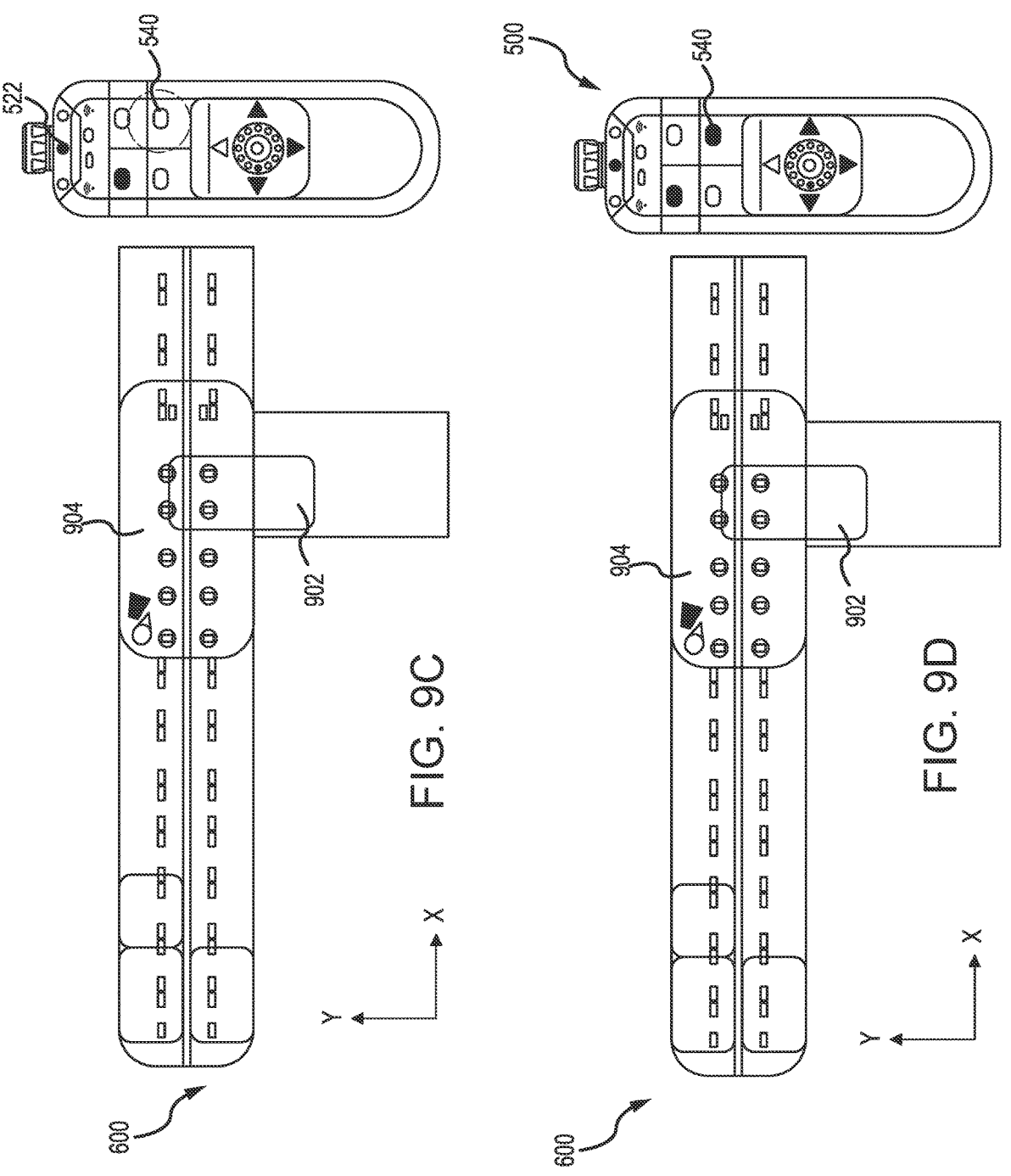

As illustrated in FIG. 9C, operator 604 enters zone of control 904 and again attempts to initiate a rotation movement. As illustrated in FIG. 9D, operator 604 is successful in initiating a rotation movement, as indicated by rotate indicator 540, while in zone of control 904. Operator 604 may control cargo handling system 600 to perform the rotation movement of ULD 902. As illustrated, and in various embodiments, limiting the control scope of wireless device 606 to certain areas of the cargo loading system (e.g., zone of control 904) depending on different use cases and/or locations improves safety and security of the operators and the aircraft.

Figures 10A, 10B:
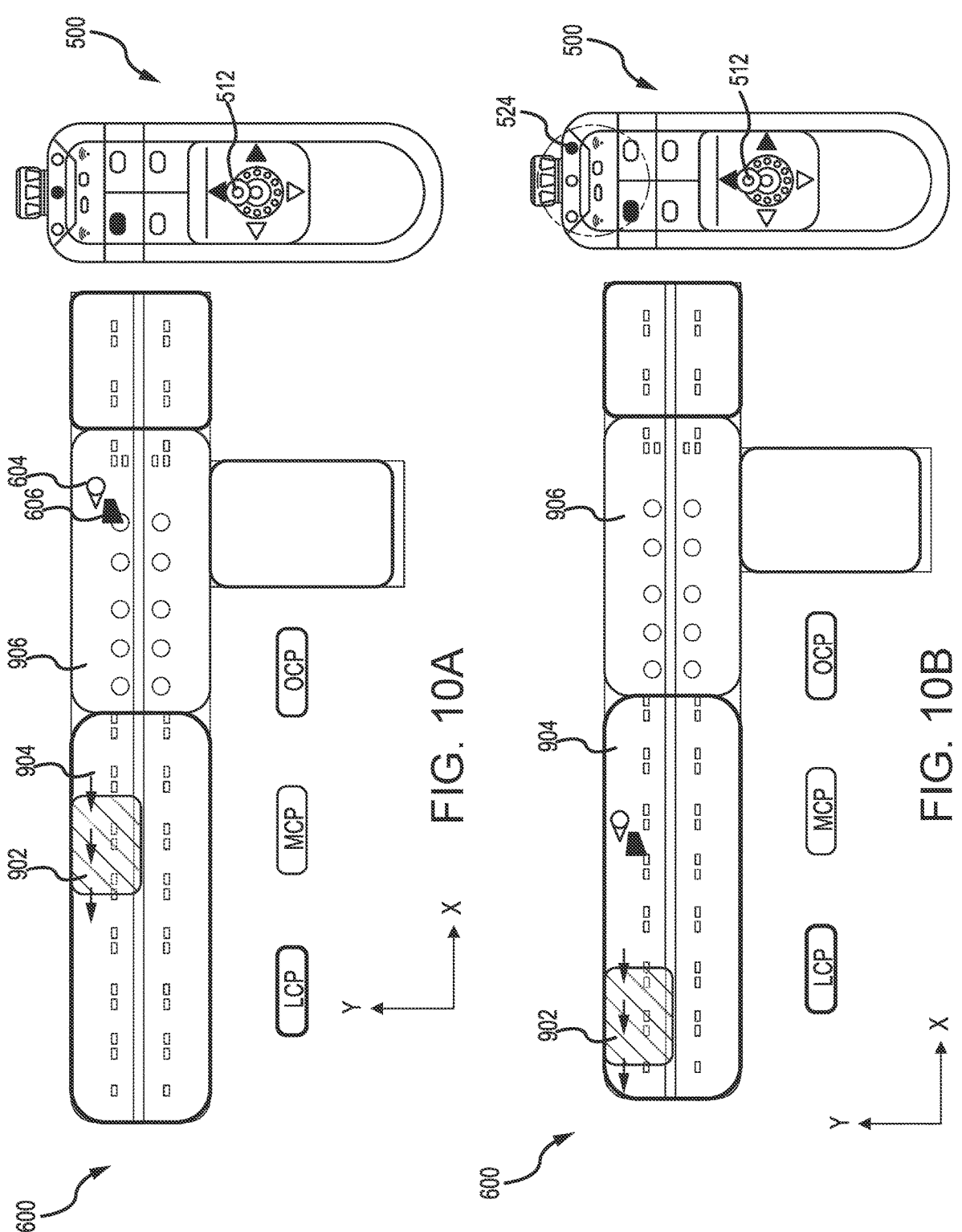
FIGS. 10A and 10B illustrate automatic zone control for a single wireless controller based on the real-time location of the wireless controller in a cargo handling system, in accordance with various embodiments.

Referring now to FIGS. 10A and 10B, automatic zone control for a single wireless device 606 based on the real-time location of wireless device 606 in cargo handling system 600 is illustrated, in accordance with various embodiments. As illustrated in FIG. 10A, operator 604 is using wireless device 606 to move unit load device (ULD) 902 within a zone of control 904 cargo handling system 600. Operator 604, and by extension wireless device 606, is located in a second control zone 906 while attempting to move ULD 902. RTLS device 500 is illustrated as having MCP indicator 522 is active, indicating that operator 604 may control all of cargo handling system 600. As illustrated in FIG. 10A, and in various embodiments, operator 604 may control ULD 902 from anywhere within cargo handling system 600 as long as there is only one operator present within cargo handling system 600. However, in various embodiments, operation of different control zones may be restricted to operators, and more specifically, wireless devices 606 that are located within the control zone. That is, operator 604 and wireless device 606 are located in second control zone 906 and is therefore unable to control ULD 902 in zone of control 904.

As illustrated in FIG. 10B, operator 604 and wireless device 606 move into zone of control 904 and wireless device 606 (e.g., RTLS device 500) transitions to local control as indicated by LCP indicator 524. Operator 604 may continue to move ULD 902 and operator cargo handling system within zone of control 904.

Figures 11A, 11B:
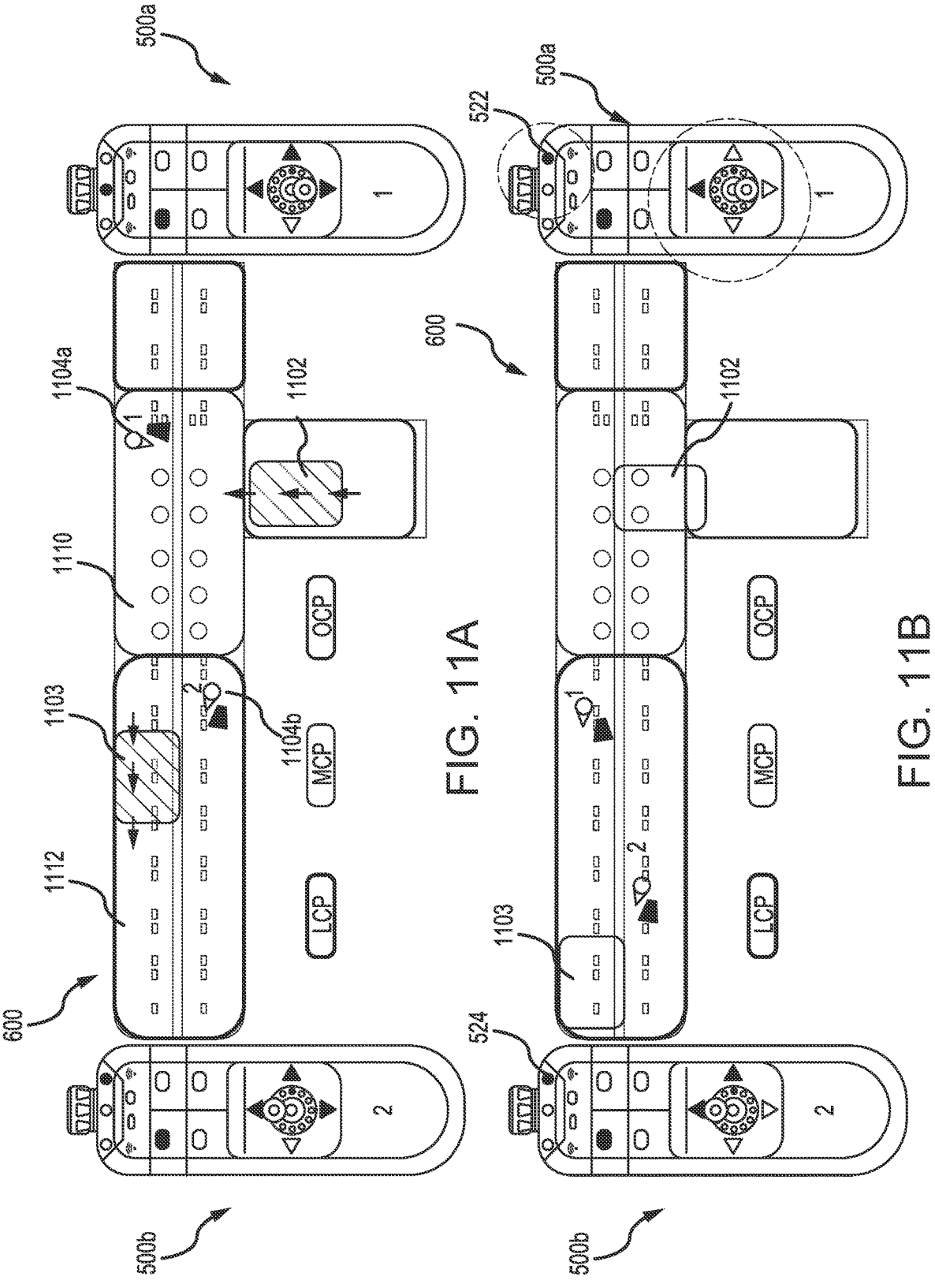
FIGS. 11A, 11B, 11C, and 11D illustrate automatic zone control for multiple wireless controllers based on the real-time location of the multiple wireless controllers in a cargo handling system, in accordance with various embodiments.

Referring now to FIGS. 11A-11D, automatic zone control for multiple wireless devices 606 based on the real-time location of the multiple wireless devices 606 in cargo handling system 600 is illustrated, in accordance with various embodiments. As illustrated in FIG. 11A, a first operator 1104a using a first RTLS device 500a is moving a unit load device (ULD) 1102 into a first control zone 1110 and a second operator 1104b using a second RTLS device 500b is moving a second ULD 1103 in a second control zone 1112. First RTLS device 500a is in master control mode as indicated by MCP indicator 522 and second RTLS device 500b is in local control mode as indicated by LCP indicator 524.

As illustrated in FIG. 11B, first operator 1104a enters second control zone 1112 causing first RTLS device 500a to transition to local control mode as indicated by LCP indicator 524. The transition is caused by the real-time location of second RTLS device 500a within cargo handling system 600. In various embodiments, as illustrated in FIG. 11B, cargo handling system 600 may remove the ability to control second control zone 1112 from first RTLS device 500a in response to second control device 500b already being in and control second control zone 1112. This is indicated by control indicators 542 being deactivated.

Figure 11C:
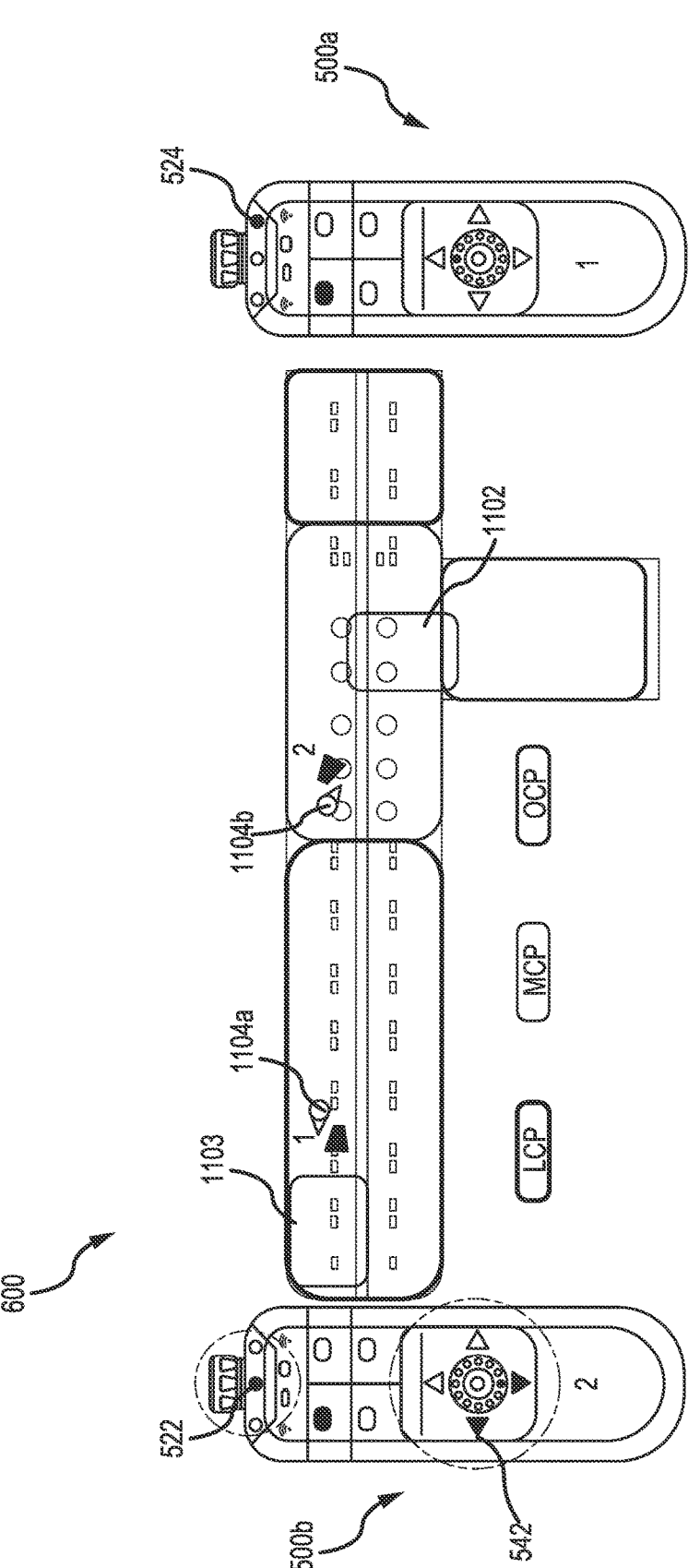

As illustrated in FIG. 11C, second RTLS device 500b switches to master control mode as indicated by MCP indicator 522 being activated and LCP indicator 524 being deactivated. In various embodiments, cargo handling system 600 may automatically switch control of different control zones to the RTLS device 500 that is presently in the control zone in response to only one RTLS device 500 being in the control zone. In various embodiments, cargo handling system 600 may prompt operator 604 to select a control mode and/or a control zone either manually or by moving in response to entering or exiting a control zone. In various embodiments, NFC chip 516 may be used, in addition to the real-time location of RTLS device 500, to select a zone to control within cargo handling system 600.

Figure 11D:
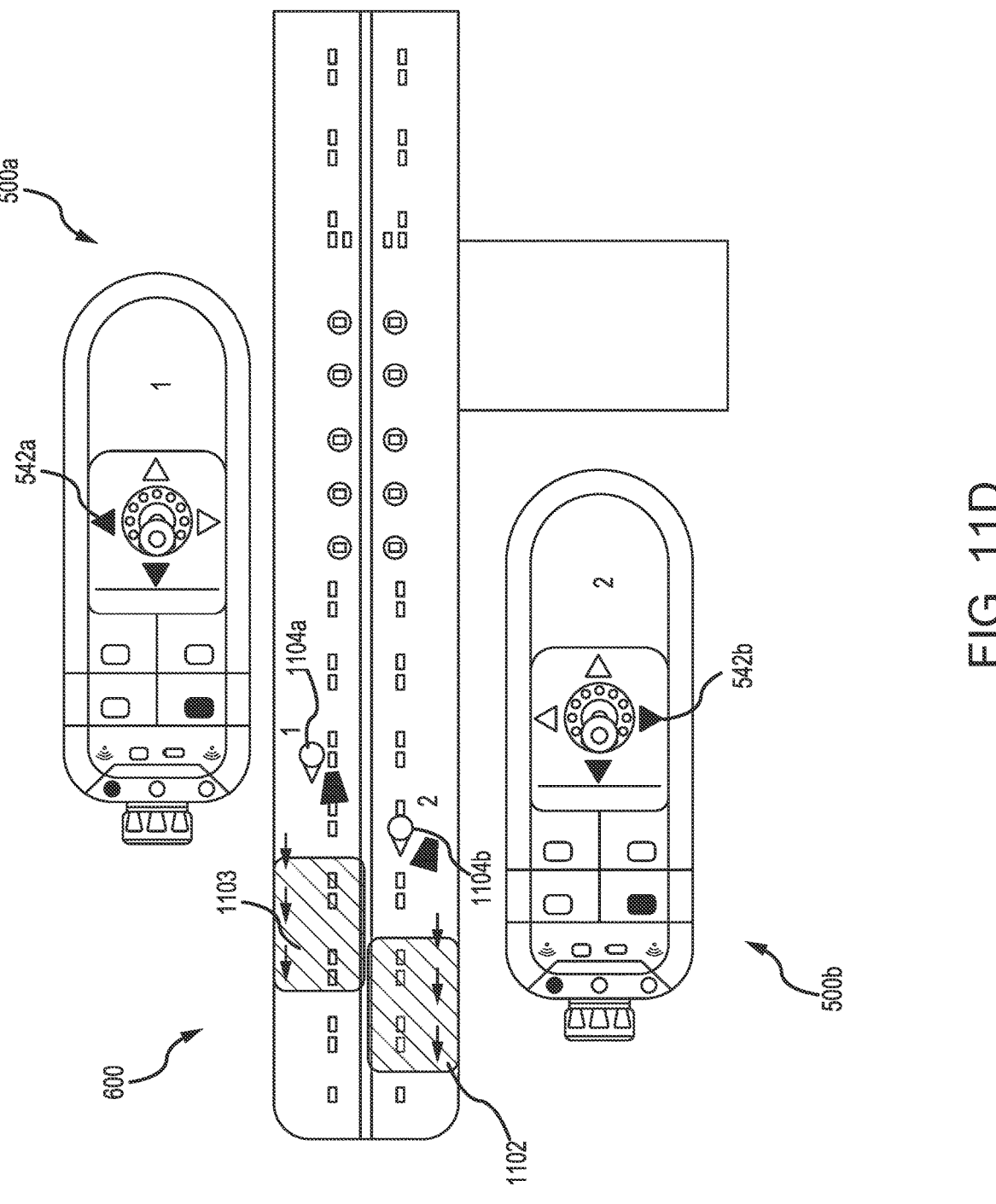

As illustrated in FIG. 11D, control of a zone in cargo handling system 600 may be further restriction to a portion of the zone (e.g., port-side or starboard-side). First operator 1104a is using first RTLS device 500a that is configured to operate the starboard-side (e.g., in the positive y-direction) track of cargo handling system 600. Second operator 1104b is using second RTLS device 500b that is configured to operate the port-side (e.g., in the negative y-direction) track of cargo handling system 600. This allows multiple operators to move load and unload cargo more efficiently. In various embodiments, indicators 542a of first RTLS device 500a may provide an indication that first RTLS device 500a is configured to control the starboard-side track and indicators 542b of second RTLS device 500b may provide an indication that second RTLS device 500b is configured to control the port-side track. In various embodiments, the selection of port-side and starboard-side may be location specific. In various embodiments, the selection of port-side and starboard-side may be determined by scanning an NFC card using NFC chip 516.

Principles of the present disclosure may be compatible with and/or desirably utilized in connection with concepts disclosed in the following documents. Additional details about orientation of RTLS device 500 may be found in U.S. patent application Ser. No. 17/507,621, filed Oct. 21, 2021, and titled "Method for Orientation and Tracking of Wireless Cargo Devices". Further details about orientation calibration of RTLS device 500 may be found in U.S. patent application Ser. No. 18/334,148, filed Jun. 13, 2023, and titled "Calibration for Wireless Cargo Device Relative Orientation". Further details about position estimation may be found in U.S. patent application Ser. No. 17/537,130, filed Nov. 29, 2021, and titled "Wireless Tracking and Ranging for Cargo Systems." The disclosures of the foregoing applications are incorporated herein by reference in their entirety, including but not limited to those portions that specifically appear hereinafter, but except for any subject matter disclaimers, or disavowals, and except to the extent that the incorporated material is inconsistent with the express disclosure herein, in which case the language in this disclosure shall control.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 5% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 5% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A cargo controller, comprising:
   a wireless emergency module including an ultra-wide band radio, the wireless emergency module configured to communicate with a plurality of cargo emergency stations of a cargo handling system using the ultra-wide band radio;
   a wireless control module configured to communicate with a cargo control station of the cargo handling system;
   a processor; and
   a memory operatively coupled to the processor, the memory comprising instructions stored thereon that, when executed by the processor, cause the processor to:
      receive ultra-wide band radio signals from the plurality of cargo emergency stations;
      determine a location within the cargo handling system based on the received ultra- wide band radio signals;
      transmit the location to the cargo handling system;
      identify a local control zone associated with the location; and
      grant control of a power drive unit within the local control zone to the wireless control module based on the location.

2. The cargo controller of claim 1, further comprising:
   an input device configured to indicate a direction to move a unit load device within the cargo handling system; and
   wherein the instructions, when executed by the processor, further cause the processor to:
      receive an indication of a control zone to be operated by the cargo controller; and
      transmit received input from the input device to the cargo handling system in response to the cargo controller being located in the control zone.

3. The cargo controller of claim 2, wherein the instructions, when executed by the processor, further cause the processor to:
   receive an indication of the control zone to be operated by the cargo controller; and
   ignore input from the input device in response to the cargo controller being outside of the control zone.

4. The cargo controller of claim 1, further comprising:
   a plurality of control mode indicators;
   a plurality of cargo operation indicators; and
   a plurality of orientation indicator lights.

5. The cargo controller of claim 4, wherein each of the plurality of control mode indicators indicates a mode control for a control zone in the cargo handling system based at least in part on the location of the cargo controller.

6. The cargo controller of claim 4, wherein each of the plurality of cargo operation indicators indicate a cargo handling operation that can be performed based at least in part on the location of the cargo controller.

7. The cargo controller of claim 4, wherein the plurality of orientation indicator lights indicates an orientation of the cargo controller within the cargo handling system.

8. A cargo handling system, comprising:
   a plurality of power drive units (PDUs);
   a plurality of real-time location system (RTLS) anchors disposed within the cargo handling system;
   a first RTLS device configured to communicate with the plurality of RTLS anchors and determine a real-time location of the first RTLS device based at least in part on the communication with the plurality of RTLS anchors;
   a processor; and
   a memory operatively coupled to the processor, the memory comprising instructions stored thereon that, when executed by the processor, cause the processor to:
      receive a first location from the first RTLS device;
      receive a cargo transfer input from the first RTLS device; and activate the plurality of PDUs to move a unit load device (ULD) in a first zone of the cargo handling system in response to the cargo transfer input and based on the first location being within the first zone.

9. The cargo handling system of claim 8, further comprising:

a second RTLS device configured to communicate with the plurality of RTLS anchors and determine a second real-time location of the second RTLS device based at least in part on the communication with the plurality of RTLS anchors; and wherein the instructions, when executed by the processor, further cause the processor to:

receive a second location from the second RTLS device; and deactivate the plurality of PDUs in response to the second location being in the first zone and in a path of travel of the ULD.

10. The cargo handling system of claim 9, wherein the instructions, when executed by the processor, further cause the processor to:

receive a third location from the second RTLS device; and activate the plurality of PDUs in response to the third location being in a second zone.

11. The cargo handling system of claim 9, wherein the instructions, when executed by the processor, further cause the processor to:

prevent the second RTLS device from controlling the plurality of PDUS in the first zone in response to the first RTLS device being in the first zone before the second RTLS device.

12. The cargo handling system of claim 8, wherein the instructions, when executed by the processor, further cause the processor to:

receive an input from the first RTLS device to rotate the ULD in a second zone; and send an alert to the first RTLS device in response to the first location being outside of the second zone.

13. The cargo handling system of claim 8, wherein the first RTLS device communicates with the plurality of RTLS anchors using ultra-wide band radio signals.

14. The cargo handling system of claim 8, wherein the instructions, when executed by the processor, further cause the processor to:

receive a second location from the first RTLS device; and prevent the first RTLS device from controlling the plurality of PDUs in the first zone in response to the second location being outside of the first zone.

15. The cargo handling system of claim 8, wherein the instructions, when executed by the processor, further cause the processor to:

determine a zone of danger for the first RTLS device based on the first location; and stopping a movement of the ULD in response to the ULD entering the zone of danger.

16. The cargo handling system of claim 8, wherein the instructions, when executed by the processor, further cause the processor to:

receiving a second location from the first RTLS device;

deactivate control of the first zone for the first RTLS device based on the second location; and activate control of a second zone for the first RTLS device based on the second location.

17. A cargo handling system, comprising:

a plurality of power drive units (PDUs);

a plurality of real-time location system (RTLS) anchors disposed within the cargo handling system;

a first RTLS device configured to communicate with the plurality of RTLS anchors and determine a first real-time location of the first RTLS device based at least in part on the communication with the plurality of RTLS anchors;

a second RTLS device configured to communicate with the plurality of RTLS anchors and determine a second real-time location of the first RTLS device based at least in part on the communication with the plurality of RTLS anchors;

a processor; and a memory operatively coupled to the processor, the memory comprising instructions stored thereon that, when executed by the processor, cause the processor to:

define a plurality of control zones within the cargo handling system, each of the plurality of control zones including a subset of the plurality of PDUs;

receive a first location from the first RTLS device;

receive a second location from the second RTLS device;

grant permission to the first RTLS device to control a first zone of the plurality of control zones based on the first location; and grant permission to the second RTLS device to control a second zone of the plurality of control zones based on the second location.

18. The cargo handling system of claim 17, wherein the instructions, when executed by the processor, further cause the processor to:

activate a first subset of the plurality of PDUs to move a unit load device within the first zone in response to an input from the first RTLS device; and stop the movement of the ULD after the ULD enters the second zone.

19. The cargo handling system of claim 17, wherein the instructions, when executed by the processor, further cause the processor to:

receive a third location from the first RTLS device;

deny permission to the first RTLS device to control the second zone in response to the third location being in the second zone and the second RTLS device having permission to control the second zone.

20. The cargo handling system of claim 17, wherein the instructions, when executed by the processor, further cause the processor to:

receive a third location from the first RTLS device;

remove permission from the first RTLS device to control the first zone based on the third location; and grant permission to the first RTLS device to control a third zone of the plurality of control zones based on the third location.

* * * * *